(12) United States Patent　　(10) Patent No.:　US 12,572,799 B2
Sahin et al.　　(45) Date of Patent:　Mar. 10, 2026

(54) METHODS FOR RELIABLE OVER-THE-AIR COMPUTATION AND FEDERATED EDGE LEARNING

(71) Applicant: UNIVERSITY OF SOUTH CAROLINA, Columbia, SC (US)

(72) Inventors: Alphan Sahin, Columbia, SC (US); Bryson Everette, Columbia, SC (US); Safi Shams Muhtasimul Hoque, West Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 990 days.

(21) Appl. No.: 17/728,119

(22) Filed: Apr. 25, 2022

(65) Prior Publication Data

US 2022/0391696 A1　　Dec. 8, 2022

Related U.S. Application Data

(60) Provisional application No. 63/192,671, filed on May 25, 2021, provisional application No. 63/313,321, filed on Feb. 24, 2022.

(51) Int. Cl.
　　$G06N\ 3/08$　　(2023.01)
　　$G06N\ 3/048$　　(2023.01)
　　$H04L\ 5/00$　　(2006.01)
(52) U.S. Cl.
　　CPC .............. $G06N\ 3/08$ (2013.01); $G06N\ 3/048$ (2023.01); $H04L\ 5/001$ (2013.01)

(58) Field of Classification Search
None
See application file for complete search history.

(56) References Cited

PUBLICATIONS

Troglia M. FaIR: Federated Incumbent Detection in CBRS Band. 2019 IEEE International Symposium on Dynamic Spectrum Access Networks (DySPAN), Nov. 2019. Retrieved from internet <https://ieeexplore.ieee.org/abstract/document/8935736> ( Year: 2019).*
Elbir et al., "Federated Learning for Hybrid Beamforming in mm-Wave Massive MIMO", downloaded from <https://arxiv.org/pdf/2005.09969> (Aug. 22, 2020), 5 pp. (Year: 2020).*

(Continued)

*Primary Examiner* — Abdullah Al Kawsar
(74) *Attorney, Agent, or Firm* — DORITY & MANNING, P.A.

(57) ABSTRACT

System and method for an over-the-air computation (Air-Comp) scheme for federated edge learning (FEEL) doesn't require channel state information (CSI) at the edge devices (EDs) or edge server(ES). The disclosure adopts the majority vote (MV) principle and defines multiple subcarriers and orthogonal frequency division multiplexing (OFDM) symbols for voting options, which reduces to frequency-shift keying (FSK) over OFDM subcarriers as a special case. Thus, FSK-based over-the-air computation is provided for federated edge learning without channel state information. Since the votes from EDs are separated on orthogonal resources, the scheme eliminates the need for truncated-channel inversion (TCI) at the EDs and allows the ES to detect MV with a non-coherent detector.

14 Claims, 19 Drawing Sheets

(56)                    References Cited

PUBLICATIONS

Sharif M. On multicarrier signals where the PMEPR of a random codeword is asymptotically logn. IEEE Transactions on Information Theory ( vol. 50, Issue: 5, May 4, 2004), pp. 895-903. Retrieved from <https://ieeexplore.ieee.org/document/1291738> (Year: 2004).*

Zhu et al., "Broadband Analog Aggregation for Low-Latency Federated Edge Learning (Extended Version)", downloaded from <https://arxiv.org/abs/1812.11494#> (Dec. 30, 2018), 30 pp. (Year: 2018).*

Amiri M. Collaborative Machine Learning at the Wireless Edge with Blind Transmitters. 2019 IEEE Global Conference on Signal and Information Processing (GlobalSIP) [online] Nov. 2019. Retrieved from internet <https://ieeexplore.ieee.org/abstract/document/8969185> (Year: 2019).*

Eugene Grayver and Babak Daneshrad; A Low-Power All-Digital FSK Receiver for Space Applications; IEEE Transactions on Communications, vol. 49, No. 5, May 2001 (Year: 2001).*

Co-Pending U.S. Appl. No. 17/837,757, filed Jun. 10, 2022.

Kakkavas et al., On PAPR Characteristics of DFT-s-OFDM with Geometric and Probabilistic Constellation Shaping, 2017 IEEE 18th International Workshop on Signal Processing Advances in Wireless Communications (SPAWC), 2017, 5 Pages. https://doi.org/10.1109/SPAWC.2017.8227810.

Sahin et al., Flexible DFT-S-OFDM: Solutions and Challenges, IEEE Communications Magazine, vol. 54, Issue 11, 2016, 106-112. (Abstract Only) https://doi.org/10.1109/MCOM.2016.1600330CM.

Amiri et al., Collaborative Machine Learning at the Wireless Edge with Blind Transmitters, 2019 IEEE Global Conference on Signal and Information Processing (GlobalSIP), Ottawa Canada, 2019, pp. 1-5. (Abstract Only) https://ieeexplore.iee.org/document/8969185.

Amiri et al., Federated Learning over Wireless Fading Channels, IEEE Transactions on Wireless Communications, vol. 19, Issue 5, 2020, pp. 3546-3557, https://arxiv.org/pdf/1907.09769.pdf.

Bernstein et al., signSGD: Compressed Optimisation for Non-Convex Problems, Proceedings of the 35th International Conference on Machine Learning, PMLR 80, 2018, pp. 560-569. http://proceedings.mlr.press/v80/bernstein18a/bernstein18a.pdf.

Chen et al., Distributed Learning in Wireless Networks: Recent Progress and Future Challenges, ARVIX, 2021, 23 Pages. https://arxiv.org/pdf/2104.02151.pdf.

Dahlman et al., 5G NR: The Next Generation Wireless Access Technology, Book, Academic Press, 2020. https://books.google.com/books?hl=en&hr=-&id=-bfjDwAAQBAJ&oi=fnd&pg=PPI&dq=5G+NR:+The+Next+Generation+Wireless+Access+Technology&ots=5LkvB5NW7r&sig=2gNP4qUxdOXnaBNeB0kotYV2g#v=onepage&q=5G%20NR%3A%20The%20Next%20Generation%20Wireless%20Access%20Technology&f=false.

Gafni et al., Federated Learning: A Signal Processing Perspective, ARXIV, Electrical Engineering and Systems Science, Signal Processing, 2021, 24 Pages. https://arxiv.org/pdf/2103.17150.pdf.

Goldenbaum et al., Harnessing Interference for Analog Function Computation in Wireless Sensor Networks, IEEE Transactions on Signal Process, vol. 61, Issue 20, Oct. 15, 2013, pp. 4893-4906. (Abstract Only) https://ieeexplore.iee.org/abstract/document/6557530.

Hellstrom et al., Wireless for Machine Learning: A Survey, Foundations and Trends in Signal Processing, V3, Jun. 2022, 113 Pages. https://arxiv.org/abs/2008.13492.

Jawhar et al., A Review of Partial Transmit Sequence for PAPR Reduction in the OFDM Systems, IEEE Access, vol. 7, 2019, pp. 18021-18041. https://ieeexplore.ieee.org/document/8637941 https://www.researchgate.net/publication/343244103_Federated_Learning_in_the_Sky_Joint_Power_Allocation_and_Scheduling_with_UAV_Swarms.

Liu et al., Over-the-Air Computation Systems: Optimization, Analysis and Scaling Laws, IEEE Transactions on Wireless Communications, vol. 19, Issue 8, Aug. 2020, pp. 5488-5502. (Abstract Only) https://ieeexplore.iee.org/document/9095231.

Nazer et al., Computation Over Multiple-Access Channels, IEEE Transactions on Information Theory, vol. 53, Issue 10, Oct. 2007, pp. 3498-3516. (Abstract Only) https://ieeexplore.ieee.org/document/4305404.

Sahin et al., Over-the-Air Computation with DFT-Spread OFDM for Federated Edge Learning, 2022 IEEE Wireless Communications and Networking Conference (WCNC), Austin TX, 2022, pp. 1886-1891. https://arxiv.org/pdf/2112.13439.pdf.

Sery et al. Over-the-Air Federated Learning from Heterogeneous Data, IEEE Transactions on Signal Processing, ARXIV, Oct. 2020, 15 Pages. https://arxiv.org/pdf/2009.12787.jxlf.

Yang et al., Federated Learning via Over-the-Air Computation, IEEE Transactions on Wireless Communications, vol. 19, Issue 3, 2020, pp. 2022-2035. https://ieeexplore.ieee.org/document/8952884.

Zeng et al., Federated Learning in the Sky: Joint Power Allocation and Scheduling with UAV Swarms, IEEE International Conference on Communications (ICC), 2020, pp. 1-6. https://www.researchgate.net/publication/343244103_Federated_Learning_in_the_Sky_Joint_Power_Allocation_and_Scheduling_with_UAV_Swarms/citation/download.

Zhu et al., Broadband Analog Aggregation for Low-Latency Federated Edge Learning, IEEE Transactions on Wireless Communications, vol. 19, Issue 1, Jan. 2020, pp. 491-506. (Abstract Only) https://ieeexplore.ieee.org/document/8870236.

Zhu et al., One-Bit Over-the-Air Aggregation for Communication-Efficient Federated Edge Learning: Design and Convergence Analysis, IEEE Transactions on Wireless Communications, vol. 20, Issue 3, Mar. 2021, pp. 2120-2135. (Abstract Only) https://ieeexplore.ieee.org/document/9272666.

* cited by examiner

FIG. 6B (TABLE I)

NEURAL NETWORK AT THE EDs.

| Layer | Learnables |
|---|---|
| Input ($28 \times 28 \times 1$ images) | N/A |
| Convolution 2D ($5 \times 5$, 20 filters) | Weights: $5 \times 5 \times 1 \times 20$<br>Bias: $1 \times 1 \times 20$ |
| Batchnorm | Offset: $1 \times 1 \times 20$<br>Scale: $1 \times 1 \times 20$ |
| ReLU | N/A |
| Convolution 2D ($3 \times 3$, 20 filters) | Weights: $3 \times 3 \times 20 \times 20$<br>Bias: $1 \times 1 \times 20$ |
| Batchnorm | Offset: $1 \times 1 \times 20$<br>Scale: $1 \times 1 \times 20$ |
| ReLU | N/A |
| Convolution 2D ($3 \times 3$, 20 filters) | Weights: $3 \times 3 \times 20 \times 20$<br>Bias: $1 \times 1 \times 20$ |
| Batchnorm | Offset: $1 \times 1 \times 20$<br>Scale: $1 \times 1 \times 20$ |
| ReLU | N/A |
| Fully-connected layer (10 outputs) | Weights: $10 \times 11520$<br>Bias: $10 \times 1$ |
| Softmax | N/A |

METHODS FOR RELIABLE OVER-THE-AIR COMPUTATION AND FEDERATED EDGE LEARNING

PRIORITY CLAIMS

The present application claims the benefit of priority of U.S. Provisional Patent Application No. 63/192,671, titled Methods for Reliable Over-The-Air Computation and Federated Edge Learning, filed May 25, 2021; and claims the benefit of priority of U.S. Provisional Patent Application No. 63/313,321, titled Methods for Reliable Over-The-Air Computation and Federated Edge Learning, filed Feb. 24, 2022, both of which are fully incorporated herein by reference for all purposes.

BACKGROUND OF THE PRESENTLY DISCLOSED SUBJECT MATTER

Federated edge learning (FEEL) is a distributed learning framework that leverages the computational powers of edge devices (EDs) and uses the local data at the EDs without compromising their privacy to train a model[1], [2]. In FEEL, the initial model parameters are first distributed to many EDs for an edge server (ES). The EDs then share their local updates, e.g., updated model parameters or local gradients, based on local data with the ES. After the local updates are aggregated at the ES, the global updates are distributed back to the EDs for the next iteration. Since a large number of parameters needs to be transmitted from the EDs to the ES for each iteration, the communication aspect of FEEL stands as one of the main bottlenecks. To address this issue, one of the promising solutions is to perform the aggregation with over-the-air computation (AirComp) that harnesses the signal-superposition property of the wireless multiple access channel[3]-[5]. However, developing a broadband AirComp scheme is not trivial due to the multipath channel and often channel state information (CSI) needs to be available at the EDs or ES. In this disclosure, we address this issue with a novel scheme.

In the literature, several AirComp schemes are investigated for FEEL. In one example, the local model parameters at the EDs are transmitted over orthogonal frequency division multiplexing (OFDM) subcarriers to achieve broadband analog aggregation (BAA) of the model parameters over the air[6]. To overcome the impact of multipath channel on the transmitted signals, the symbols on the OFDM subcarriers are multiplied with the inverse of the channel coefficients and the subcarriers that fade are excluded from the transmissions, i.e., truncated-channel inversion (TCI). In another example[7], BAA is extended to one-bit broadband digital aggregation (OBDA) to facilitate the implementation of FEEL for a practical wireless system by adopting signSGD[8]. In this method, the EDs transmit quadrature amplitude modulation (QAM) symbols over OFDM subcarriers with TCI, where the real and imaginary parts of the QAM symbols are formed by using the signs of the elements of the local gradient vectors, i.e., votes. At the ES, the estimates of the global gradients are calculated based on majority vote (MV), which corresponds to the signs of the real and imaginary components of the superposed symbols on each subcarrier. Although OBDA is compatible with digital modulations, EDs still need the CSI for TCI as in BAA for AirComp. In yet another example, an additional time-varying precoder is applied along with TCI for BAA to facilitate the aggregation[9]. EDs sparsify their gradient estimates and project the resultant sparse vector into a low-dimensional vector for bandwidth reduction. The resulting compressed data is then transmitted with BAA[10]. In other studies, blind EDs are considered. However, it is assumed that the CSI for each ED is available at the ES. The impact of channel on AirComp is mitigated through beamforming with a large number of antennas[11]-[12]. To the best of our knowledge, there is no AirComp scheme in the literature that addresses the cases where CSI is unavailable to both EDs and ES for FEEL.

SUMMARY OF THE PRESENTLY DISCLOSED SUBJECT MATTER

Aspects and advantages of the presently disclosed subject matter will be set forth in part in the following description, or may be apparent from the description, or may be learned through practice of the presently disclosed subject matter.

Broadly speaking, the presently disclosed subject matter relates to methods for reliable over-the-air computation and federated edge learning.

The presently disclosed systems/devices and the corresponding and/or associated methodologies relate to Air-Comp scheme(s) for FEEL without CSI at the EDs or ES. The proposed scheme adopts the MV principle and defines multiple subcarriers and OFDM symbols for voting options, which reduces to FSK over OFDM subcarriers as a special case. Since the votes from EDs are separated on orthogonal resources, it eliminates the need for TCI at the EDs and allows the ES to detect MV with a non-coherent detector. Since the proposed method does not encode the votes on amplitude and phase, it also admits PMEPR reduction techniques. With randomization symbols, we show that the proposed scheme provides similar PMEPR characteristics to that of OFDM while providing a high-test accuracy in fading channels.

FEEL is a distributed learning framework that leverages the computational powers of EDs and uses the local data at the EDs without compromising privacy to train a model. However, the communication aspect of FEEL stands as one of the main bottlenecks. To address this issue, one of the promising solutions is to perform the aggregation with AirComp methods that harness the signal-superposition property of the wireless multiple-access channel. However, developing a broadband AirComp scheme is not trivial due to the multipath channel and often CSI needs to be available. In this disclosure, we address this issue with a novel AirComp scheme.

The presently disclosed subject matter addresses the communication latency problem of training an artificial intelligence model over a wireless network. It reduces the latency with AirComp. However, the presently disclosed subject matter does not use the channel information (e.g., channel frequency response) needed for wireless communication at the EDs (e.g., a user) or ES (e.g., a base station).

This disclosure will most likely be a case for 5G New Radio and beyond (e.g., 6G). Further, BAA and OBDA are two major methods that reduce latency; however, they require channel state information at the EDs, which is a substantial overhead.

In addition, there is a large market size for this disclosure as it is related to both commercial wireless and AI technologies. It could be useful for artificial intelligence technologies over wireless or sensor networks, 5G and beyond, 6G wireless standardization, IEEE 802.11 Wi-Fi.

The proposed scheme does not need a channel inversion at the EDs. From this aspect, it is compatible with time-varying channels and does not lose the gradient information due to the truncation. The proposed scheme reduces PMEPR with a simple randomization technique (i.e., it does not require CSIs at the ES or multiple antennas for AirComp).

The presently disclosed subject matter is theoretically supported and its validity is tested through numerical analysis and MATLAB®-based simulations under practical wireless channel models by publicly available MNIST dataset.

Generally speaking, the presently disclosed subject matter relates to distributed learning, federated edge learning, frequency-shift keying, orthogonal frequency division multiplexing, over-the-air computation, and peak-to-mean envelope power ratio, all relating to electrical-based subject matter.

In this disclosure, we propose an AirComp scheme relying on the MV principle. Instead of encoding the votes with QAM symbols, we use multiple subcarriers and/or OFDM symbols for voting options, which corresponds to FSK over OFDM subcarriers as a special case. As the votes are aggregated on orthogonal resources with the proposed scheme, we eliminate the need for TCI at the EDs and enable the ES to determine the MV with a non-coherent detector. The proposed scheme can be used with well-known PMEPR reduction techniques as it does not utilize the amplitude and the phase to encode votes. PMEPR is reduced by using randomization symbols on active subcarriers, which also speed up the convergence for non-independent and identically distributed (IID) data.

Notation: The sets of complex and real numbers are denoted by $\mathbb{C}$ and $\mathbb{R}$, respectively. $\mathbb{E}t[\bullet]$ is the expectation of its argument over t. The signum function is denoted by $\sin(\bullet)$.

Considered another way, we propose an AirComp scheme for FEEL. The proposed scheme relies on the concept of distributed learning by MV with signSGD. As compared to the state-of-the-art solutions, with the proposed method, EDs transmit the signs of local stochastic gradients by activating one of two orthogonal resources, i.e., OFDM subcarriers, and the MVs at the ES are obtained with non-coherent detectors by exploiting the energy accumulations on the subcarriers. Hence, the proposed scheme eliminates the need for CSI at the EDs and ES. By taking path loss, power control, cell size, and the probabilistic nature of the detected MVs in fading channel into account, we prove the convergence of the distributed learning for a non-convex function. Through simulations, we show that the proposed scheme can provide a high-test accuracy in fading channels even when the time-synchronization and the power alignment at the ES are not ideal. We also provide insight into distributed learning for location-dependent data distribution for the MV-based schemes.

The disclosure deals with a system and method for an AirComp scheme for FEEL without CSI at the EDs or ES. The disclosure adopts the MV principle and defines multiple subcarriers and OFDM symbols for voting options, which reduces to FSK over OFDM subcarriers as a special case. Thus, FSK-based AirComp is provided for FEEL without CSI. Since the votes from EDs are separated on orthogonal resources, the proposed scheme eliminates the need for TCI at the EDs and allows the ES to detect MV with a non-coherent detector. We also mitigate the PMEPR of the synthesized signals by using randomization symbols. Simulations show the proposed scheme provides high test accuracy in fading channels for both IID and non-IID data while resulting in OFDM symbols with lower PMEPRs as compared to OBDA with QAM.

It is to be understood that the presently disclosed subject matter equally relates to associated and/or corresponding methodologies.

Other exemplary aspects of the present disclosure are directed to systems, apparatus, tangible, non-transitory computer-readable media, user interfaces, memory devices, and electronic devices for an AirComp scheme for FEEL without CSI at the edge devices EDs or edge server ES. To implement methodology and technology herewith, one or more processors may be provided, programmed to perform the steps and functions as called for by the presently disclosed subject matter, as will be understood by those of ordinary skill in the art.

One exemplary presently disclosed method relates to an AirComp methodology for FEEL without using CSI at a plurality of EDs or at an ES, comprising: a distributed machine-learning model to be trained with the update vectors received at an ES as transmitted from a plurality of EDs; one or more processors; and one or more non-transitory computer-readable media that store instructions that, when executed by the one or more processors, cause the one or more processors to perform operations. Such operations preferably may comprise: transmitting local update vectors as weighted votes over selected multiple orthogonal subcarriers grouped based on the sign of the elements of the update vector from each respective of the plurality of EDs via a wireless multiple access channel, receiving the superposed local updates at the ES, determining the MV for each element of the update vector at the ES with an energy detector over orthogonal time and frequency resources, and inputting the MVs into the machine-learning model to be updated.

Another exemplary embodiment of presently disclosed subject matter relates to an AirComp system for FEEL without using CSI at a plurality of EDs or at an ES, comprising a machine-learning model training to process data received at an ES as transmitted from a plurality of EDs; one or more processors; and one or more non-transitory computer-readable media that store instructions that, when executed by the one or more processors, cause the one or more processors to perform operations, the operations comprising transmitting local updates as votes over selected multiple subcarriers from each respective of the plurality of EDs via a wireless multiple access channel, receiving the local updates at the ES, aggregating the local updates at the ES including separating votes from the EDs using orthogonal resources and MV principle, and inputting the obtained data into the machine-learning model as training data or data to process.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments (and others upon review of the remainder of the specification) and will appreciate that the presently disclosed subject matter applies equally to corresponding methodologies as associated with practice of any of the present exemplary devices and vice versa.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 3A specifically illustrates AWGN, SNR is 0 dB, D=400, K=50;

FIG. 3B specifically illustrates AWGN, SNR is 20 dB, D=400, K=50;

FIG. 3C specifically illustrates AWGN, SNR is 0 dB, D=2000, K=50;

FIG. 3D specifically illustrates AWGN, SNR is 20 dB, D=2000, K=500;

FIG. 3E specifically illustrates Fading channel, SNR is 0 dB (D=400, K=50);

FIG. 3F specifically illustrates Fading channel, SNR is 20 dB (D=400, K=50);

FIG. 3G specifically illustrates Fading channel, SNR is 0 dB (D=2000, K=10);

FIG. 3H specifically illustrates Fading channel, SNR is 20 dB (D=2000, K=10);

FIG. 4A specifically illustrates AWGN, SNR is 0 dB, D=400, K=50;

FIG. 4B specifically illustrates AWGN, SNR is 20 dB, D=400, K=50;

FIG. 4C specifically illustrates AWGN, SNR is 0 dB, D=2000, K=10;

FIG. 4D specifically illustrates AWGN, SNR is 20 dB, D=2000, K=10;

FIG. 4E specifically illustrates Fading channel, SNR is 0 dB (D=400, K=50);

FIG. 4F specifically illustrates Fading channel, SNR is 20 dB (D=400, K=50);

FIG. 4G specifically illustrates Fading channel, SNR is 0 dB (D=2000, K=10);

FIG. 4H specifically illustrates Fading channel, SNR is 20 dB (D=2000, K=10);

FIG. 6B (Table 1) correlates Layers and Learnables for a Neural Network at the EDs;

Figure 1:
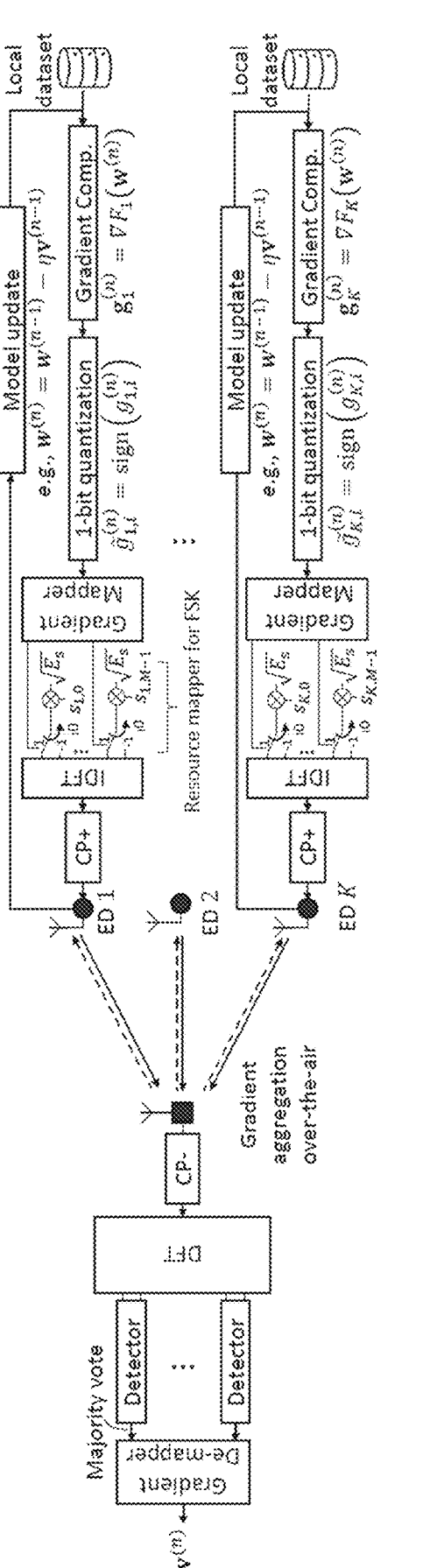
FIG. 1 is a schematic illustration of an exemplary presently disclosed embodiment of federated edge learning (FEEL) with one-bit broadband digital aggregation (OBDA) and frequency-shift keying (FSK) features.

Repeat use of reference characters in the present specification and drawings is intended to represent the same or analogous features, elements, or steps of the presently disclosed subject matter.

DETAILED DESCRIPTION OF THE PRESENTLY DISCLOSED SUBJECT MATTER

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment. Thus, it is intended that the presently disclosed subject matter covers such modifications and variations as come within the scope of the appended claims and their equivalents.

In general, the present disclosure is directed to a system in which we consider an OFDM-based FEEL system with K users. Prior to the training, the initial values of the model parameters, denoted by $w \in \mathbb{R} q$, and its structure are distributed to the EDs from an ES to set up a common learning model at the EDs, where q is the model size. We denote the local dataset containing labeled data samples at the kth ED as $|\{(\mathbf{X}_\ell, y_\ell)\} \in D_k|$ for k=1, . . . , K, where $\mathbf{X}_\ell$ and $y_\ell$ are $\ell$ th data sample and their associated label, respectively. The main goal of the FEEL system is to obtain the trained model parameters without uploading the local data to the ES.

A. Learning Model

The local loss function of the model with the parameters w at the kth ED can be calculated as:

$$F_k(w) = \frac{1}{|D_k|} \sum_{\forall (X_\ell, y_\ell) \in D_k} f(w, X_\ell, y_\ell) \tag{1}$$

where $f(w, \mathbf{X}_\ell, y_\ell)$ is the sample loss function that measures the labelling error for $(\mathbf{X}_\ell, y_\ell)$ for the parameters w.

Assuming identical local dataset sizes, i.e., $|D_k|=D$ for $k=1, \ldots, K$, the global loss function can be measured as:

$$F(w) = \frac{1}{K} \sum_{k=1}^{K} F_k(w) \tag{2}$$

In this disclosure, we focus on a FEEL system based on gradient averaging[7]. For each communication round n of FEEL, the kth ED calculates an estimate of the global gradient of the loss function in Eq. (2) by using its local dataset Dk and the parameter vector $w^{(n)}$. Assuming that all data samples in $D_k$ are used for gradient estimation, the local gradient estimate for the kth ED at the nth communication round, denoted by $g_k^{(n)}$ can be expressed as:

$$g_k^{(n)} = \nabla F_k\left(w^{(n)}\right) = \frac{1}{D} \sum_{\forall \hat{\xi} \in \mathcal{D}_k} \nabla f\left(w^{(n)}, x_\ell, y_\ell\right) \tag{3}$$

where $\nabla$ represents the gradient operator.

Assuming that the local gradient estimates are reliably received at the ES, the ES can obtain the global estimate of the gradient of the loss function in Eq. (2) as:

$$\hat{g}^{(n)} = \frac{1}{K} \sum_{k=1}^{K} g_k^{(n)} \tag{4}$$

Subsequently, the ES distributes the global gradient estimate $\hat{g}^{(n)}$ to the EDs and the current model is updated based on a common update rule, e.g., gradient descent given by $w^{(n+1)}=w^{(n)}-\eta\hat{g}^{(n)}$ where $\eta$ is the learning rate and $w^{(1)}=w$. This process is repeated consecutively until a predetermined convergence criterion is achieved.

In this disclosure, we adopted sin SGD [8] for FEEL. Instead of the actual values of local gradients, the EDs transmitted the signs of their local gradients, i.e., $\tilde{g}_k^{(n)}$ for $k=1, \ldots, K$, to the ES where the ith element of is $\tilde{g}_{k,i}^{(n)} \triangleq \sin(g_{k,i}^{(n)})$. Then the estimate of the global gradient for the ith parameter can be calculated by using the MV principle as given by:

$$v_i^{(n)} \triangleq \sin\left(y_i^{(n)}\right) \tag{5}$$

$$\text{where } y_i^{(n)} = \sum_{k=1}^{K} \tilde{g}_{k,i}^{(n)}.$$

The ES then transmitted $v^{(n)}=(v_0^{(n)}, \ldots, v_{q-1}^{(n)})$ to the EDs and the models at the EDs are updated, e.g., $w^{(n+1)}=w^{(n)}-\eta v^{(n)}$.

B. Signal Model

In this disclosure, we assume that the EDs access the wireless channel on the same time-frequency resources simultaneously for AirComp with S OFDM symbols consisting of M active subcarriers. We assume the transmissions from the EDs are synchronized in both time and frequency and arrive at the ES within the CP duration. We also assume that the CP duration is larger than the maximum-excess delays of the channels between the ES and the EDs. The superposed symbol on the l subcarrier of the mth OFDM symbol at the ES can then be written as:

$$r_{l,m} = \sum_{k=1}^{K} h_k, t^{k,l,m} + n_{l,m} \tag{6}$$

where $h_{k,l} \in \mathbb{C}$ is the channel coefficient between ES and the kth ED on the l subcarrier and $\mathbb{E}[|h_{k,l}|^2]=1$, $t_{k,l,m} \in \mathbb{C}$ is the transmitted symbol from the kth ED on the l subcarrier of the mth OFDM symbol, and $n_l$ is the zero mean additive white Gaussian noise (AWGN) with the variance $\sigma_n^2$ on the l subcarrier for $l \in \{0, 1, \ldots, M-1\}$ and $m \in \{0, 1, \ldots, S-1\}$.

Let $x(t) \in \mathbb{C}$ be the baseband OFDM symbol in continuous time for $t \in [0, T_s)$, where Ts is the OFDM symbol duration. We defined the PMEPR of an OFDM symbol as $\max_{t \in [0, T_s)} |x(t)|^2/P_{tx}$, where $P_{tx}=\mathbb{E}_t[|x(t)|^2]$ is the mean envelope power. For AirComp schemes, $P_{tx}$ changes based on the gradient information. In this disclosure, for a fair comparison, we calculate $P_{tx}$ when all subcarriers are actively utilized, i.e., $P_{tx}=M/N$, where N is the inverse DFT (IDFT) size.

FSK-Based Majority Vote

A. Transmitter

Let $f$ be a bijective function that maps $i \in \{0, 1, \ldots, q-1\}$ to the distinct pairs $(m_0, l_0)$ and $(m_1, l_1)$ for $m_0, m_1 \in \{0, 1, \ldots, S-1\}$ and $l_0, l_1 \in \{0, 1, \ldots, M-1\}$. Based on $\tilde{g}_{k,i}^{(n)}$, at the nth communication round, we propose to calculate the symbol $t_{k,l_0,m_0}$ and $t_{k,l_1,m_1}$ as:

$$t_{k,l_0,m_0} = \begin{cases} \sqrt{E_s} \times S_{k,i} & \tilde{g}_{k,i}^{(n)} = 1 \\ 0, & \tilde{g}_{k,i}^{(n)} = 0 \\ 0, & \tilde{g}_{k,i}^{(n)} = -1 \end{cases} \tag{7}$$

and $$t_{k,l_0,m_0} = \begin{cases} 0, & \tilde{g}_{k,i}^{(n)} = 1 \\ 0, & \tilde{g}_{k,i}^{(n)} = 0 \\ \sqrt{E_s} \times S_{k,i} & \tilde{g}_{k,i}^{(n)} = -1 \end{cases} \tag{8}$$

respectively, where $E_s=2$ is the normalized symbol energy and $S_{k,i}$ is a randomization symbols for $k \in \{1, \ldots, K\}$.

Therefore, the proposed scheme separates the options for voting over two different resources identified in time and frequency. In this disclosure, we chose $S_{k,i}$ based on a random quadrature phase shift keying (QPSK) symbol to reduce PMEPR by decreasing the correlation in the frequency domain[13].

In one implementation, when $\tilde{g}_{k,i}=1$, the symbols $t_{k,l_0,m_0}$ and $t_{k,l_1,m_1}$ may be chosen randomly from the set $\{1, -1\}$.

In one implementation, the symbols $t_{k,l_0,m_0}$ and $t_{k,l_1,m_1}$ can be calculated based on a weighting function. For example, $$t_{k,l_0,m_0} = \begin{cases} \sqrt{E} \times s_{k,i} \times \omega(g_{k,i}), & \tilde{g}_{k,i} = 1 \\ 0, & \tilde{g}_{k,i} \neq 1 \end{cases}$$

$$t_{k,l_1,m_1} = \begin{cases} \sqrt{E} \times s_{k,i} \times \omega(g_{k,i}), & \tilde{g}_{k,i} = -1 \\ 0, & \tilde{g}_{k,i} \neq -1 \end{cases}$$

where $g_{k,i}$ is the local stochastic gradient and $\omega(g_{k,i})$ is a weighting function. The weighting function may be an even-symmetric function that ranges from 0 to 1 in order to limit the power of the transmitted OFDM symbols. The main motivation for using a weight function is that it can lower the error probability of detecting the incorrect majority vote as compared to the sign operation. It may also increase the convergence rate in the case of heterogenous data distribution scenarios. Examples of the smooth, non-decreasing weight function for negative or positive $g_{k,i}$ are as follows:

$$\omega(g_{k,i}) = \tanh(kg_{k,i}),$$

$$\omega(g_{k,i}) = \tanh(k|g_{k,i}|),$$

and $$\omega(g_{k,i}) = \begin{cases} 1, & |g_{k,i}| > t(1+\rho) \\ 0, & g_{k,i} \leq t(1-\rho) \\ \frac{1}{2} + \frac{1}{2}\cos\left(\frac{\pi(|g_{k,i}| + t(1+\rho))}{2\rho}\right), & \text{otherwise} \end{cases}$$

where h, t, $\rho$ are some non-negative coefficients. All of these examples ensures that gradual power increases if the magnitude of the gradient local gradient is large. Therefore, if an ED has a smaller absolute local gradient, its impact on the MV becomes smaller. Similarly, if an ED has a large absolute local gradient, its impact on the MV becomes larger. Hence, the convergence speed may improve.

In one implementation, $\omega(g_{k,i})=1$ may be chosen to achieve a design based on signs as described. In one implementation, the parameters of the weight function may be tuned through the communications round. For example, the tuning may be based on maximum values of the absolute local gradients or update vectors or the communication round index.

The functionality of f can be divided into two different mappers, i.e., gradient mapper (GM) and resource mapper (RM). While GM shuffles the quantized gradients, RM identifies how the options for voting are distributed to the time and frequency resources. As a special case of RM, if $m_1=m_0$ and $l_1=l_0+1$ for all i, the adjacent subcarriers of moth OFDM symbol are used for voting, i.e., FSK over OFDM subcarriers. In this case, the weight of the kth ED's vote in the MV for the ith gradient is independent from its vote since these subcarriers are likely to experience similar channel conditions in practice, i.e., $h_{k,l_0} \approx h_{k,l_0+1}$. We denoted the proposed scheme with this specific RM as OBDA-FSK in this disclosure.

Gradient mapper and resource mapper may be utilized with an interleaver or an encryption function to increase the security of the proposed scheme. For example, gradient mapper or resource mapper may map the votes to different subcarriers for each communication round based on an encryption operation. Hence, an eavesdropper cannot recover the order of the gradients by simply capturing the transmission.

In one implementation, the symbols $t_{k,l_0,m_0}$ and $t_{k,l_1,m_1}$ may be based on an update vector, which generalizes the concept of the local stochastic gradients. For example, the machine learning model may be iterated after E local steps. In that case, the update vector may be the difference between the model parameters without local iterations and the model parameters after E local iterations.

B. Receiver

At the ES, the pairs $(m_0, l_0)$ and $(m_1, l_1)$ are first calculated by using the mapping function $f$ for a given i. Assuming independent multipath channels between the ES and the EDs, it can be shown that:

$$\mathbb{E}\left[|r_{l_0 m_0}|^2\right] = \mathbb{E}\left[\left|\sqrt{E_s} \sum_{\forall k, g_{k,i}^{(n)}=1} h_{k,l_0} s_{k,i} + n_{l_0,m_0}\right|^2\right] = E_s K_0 + \sigma_n^2, \quad (9)$$

and $$\mathbb{E}\left[|r_{l_1 m_1}|^2\right] = \mathbb{E}\left[\left|\sqrt{E_s} \sum_{\forall k, g_{k,i}^{(n)}=-1} h_{k,l_1} s_{k,i} + n_{l_1,m_1}\right|^2\right] = E_s K_0 + \sigma_n^2, \quad (10)$$

where $K_0$ and $K_1$ are the number of EDs that vote for 1 and $-1$ for the ith gradient, respectively.

Therefore, the energies on the superposed symbols $r_{l_0,m_0}$ and $r_{l_1,m_1}$ can be compared to determine the MV as:

$$v_i^{(n)} = \begin{cases} 1, & |r_{l_0 m_0}|^2 > |r_{l_1 m_1}|^2 + t \\ -1, & |r_{l_1 m_1}|^2 > |r_{l_0 m_0}|^2 + t, \\ 0, & \text{otherwise} \end{cases} \quad (11)$$

where t is the maximum distance between $|r_{l_0 m_0}|^2$ and $|r_{l_1 m_1}|^2$ to declare a tie under AWGN. In one implementation, threshold t may be set to zero values to simplify the receiver.

Figure 2:
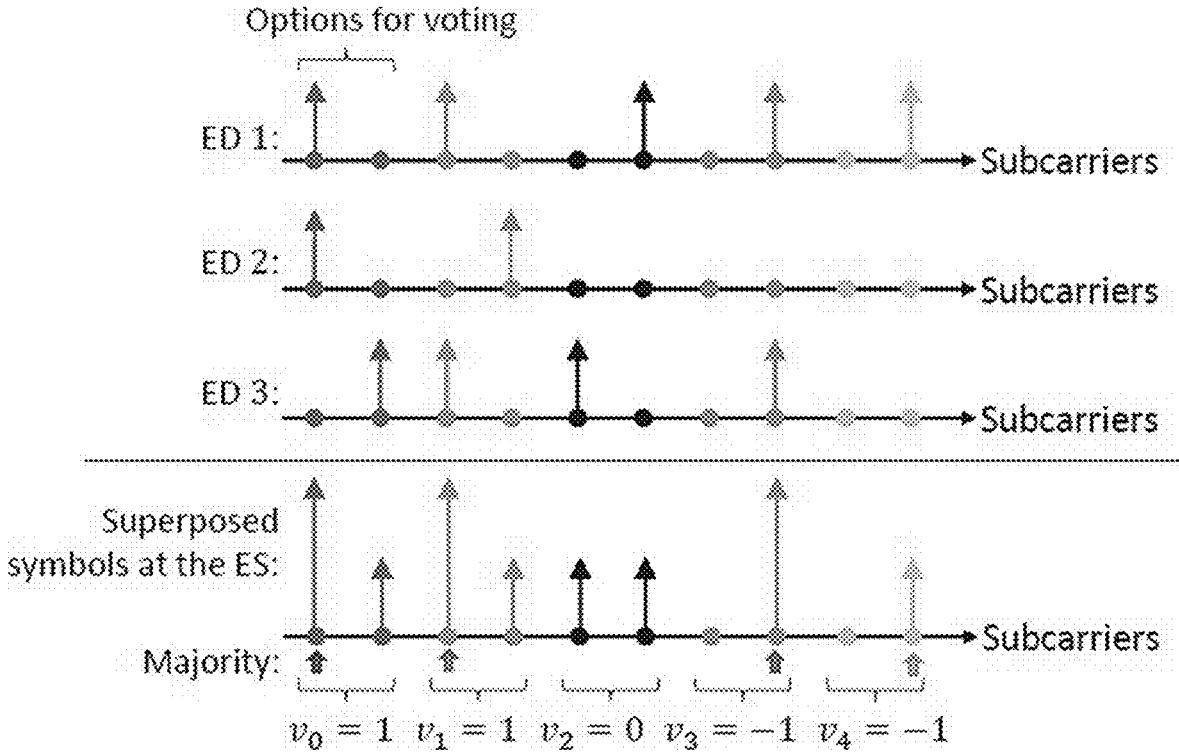
FIG. 2 illustrates multiple subcarrier examples of presently disclosed subject matter involving majority vote (MV) principles based on OBDA-FSK with K=3 EDs.
Figure 3A:
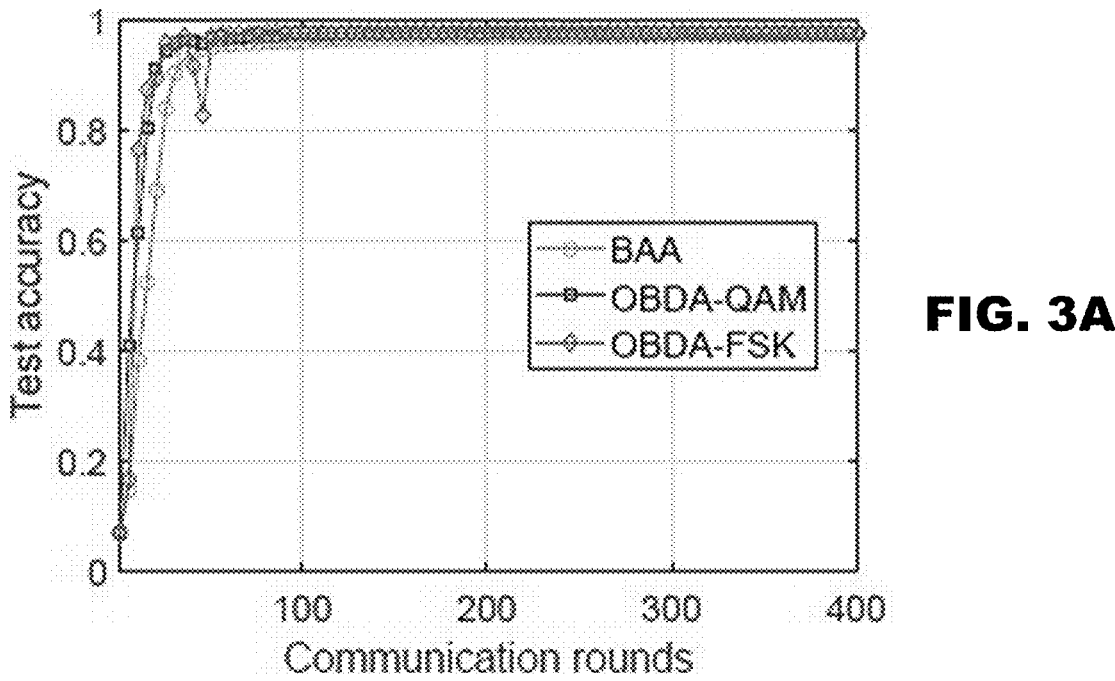
FIGS. 3A-3H show test accuracy results for non-IID data, where the FEEL with the OBDA-FSK converges without the CSI in both AWGN and fading channel.
Figure 3B:
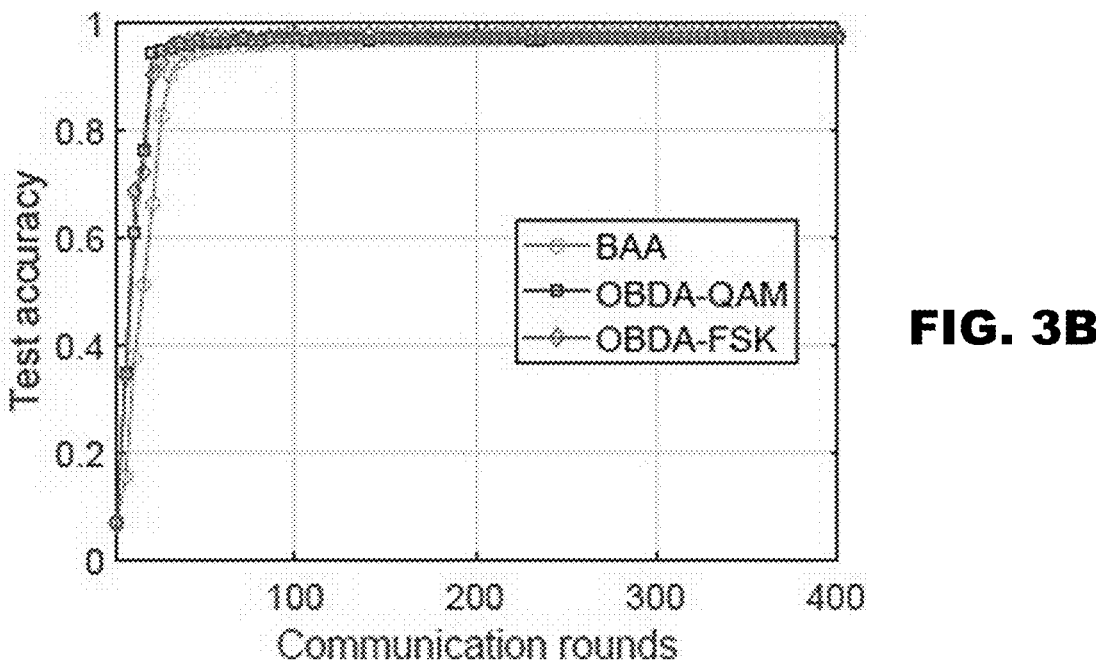
Figure 3C:
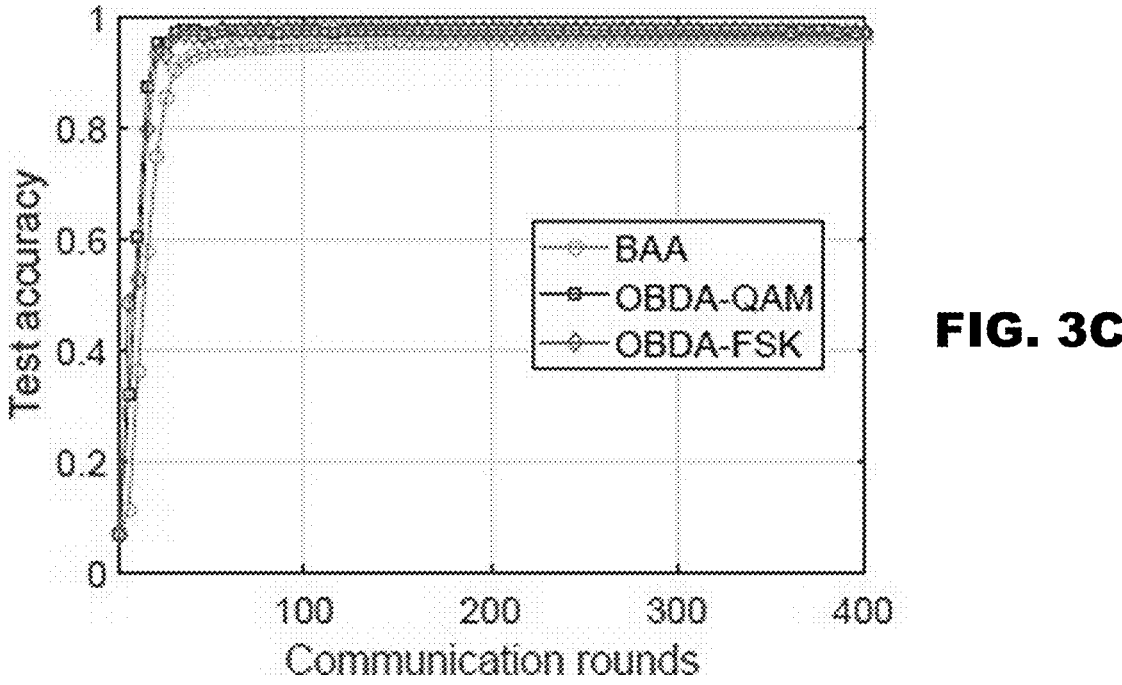
Figure 3D:
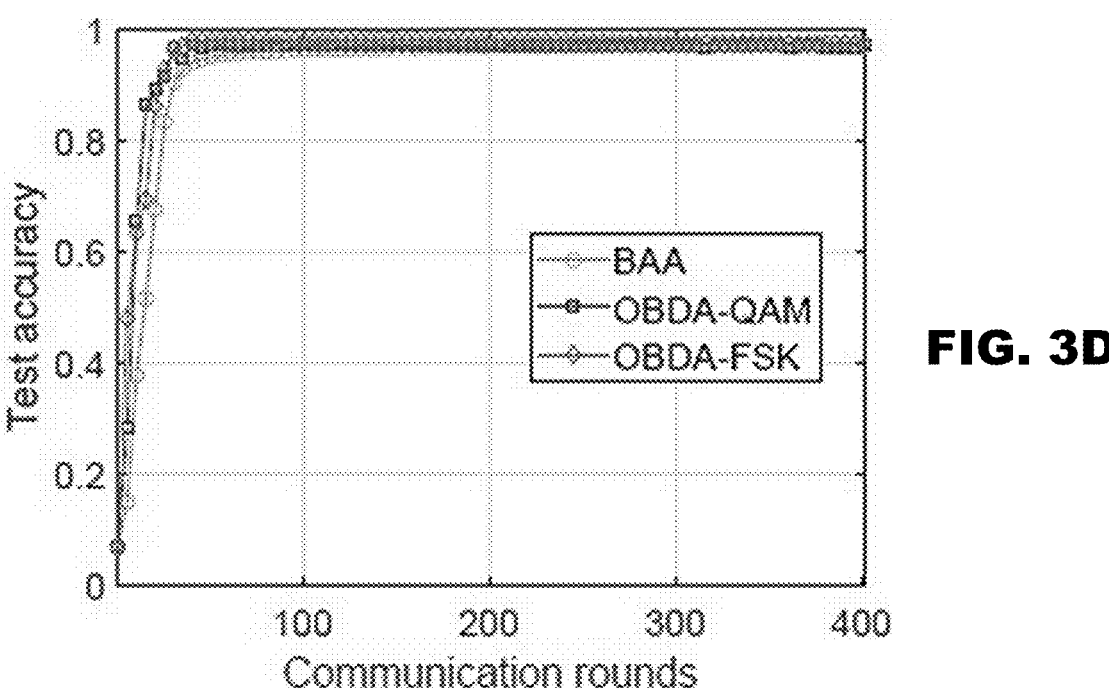
Figure 3E:
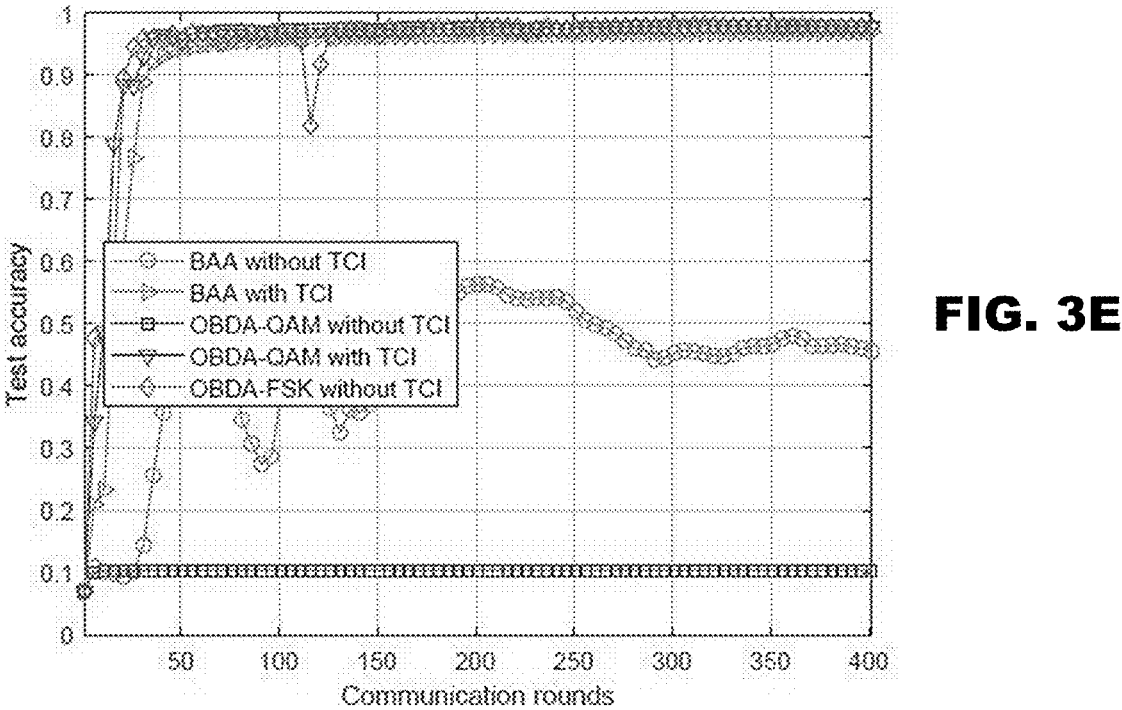
Figure 3F:
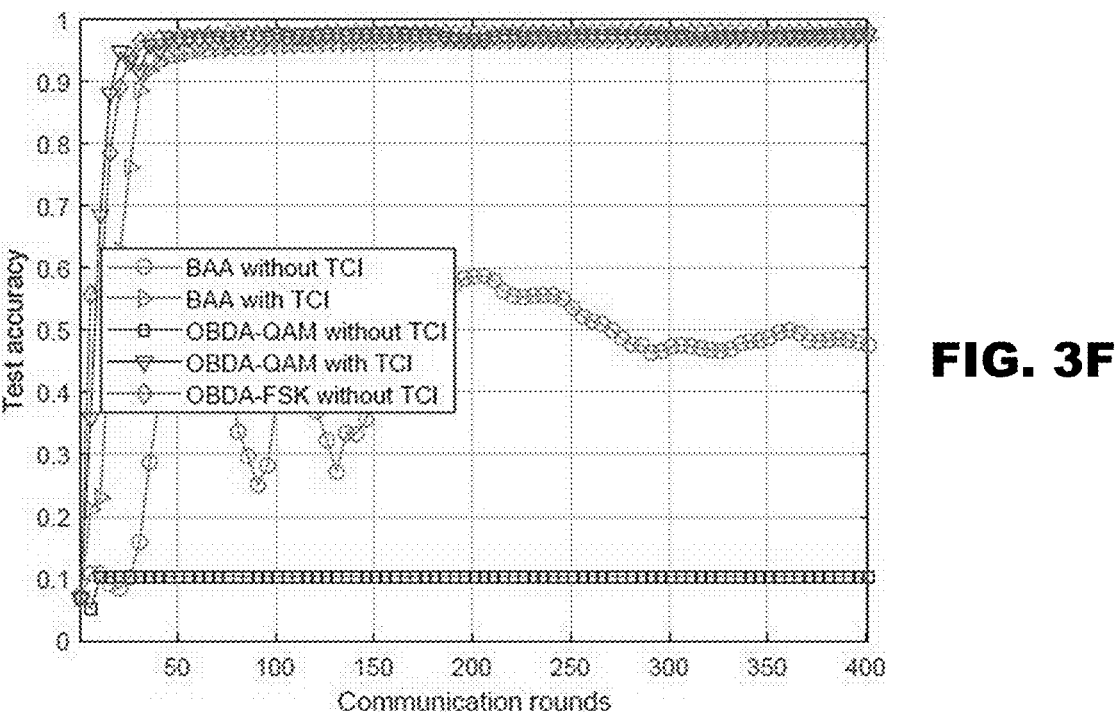
Figure 3H:
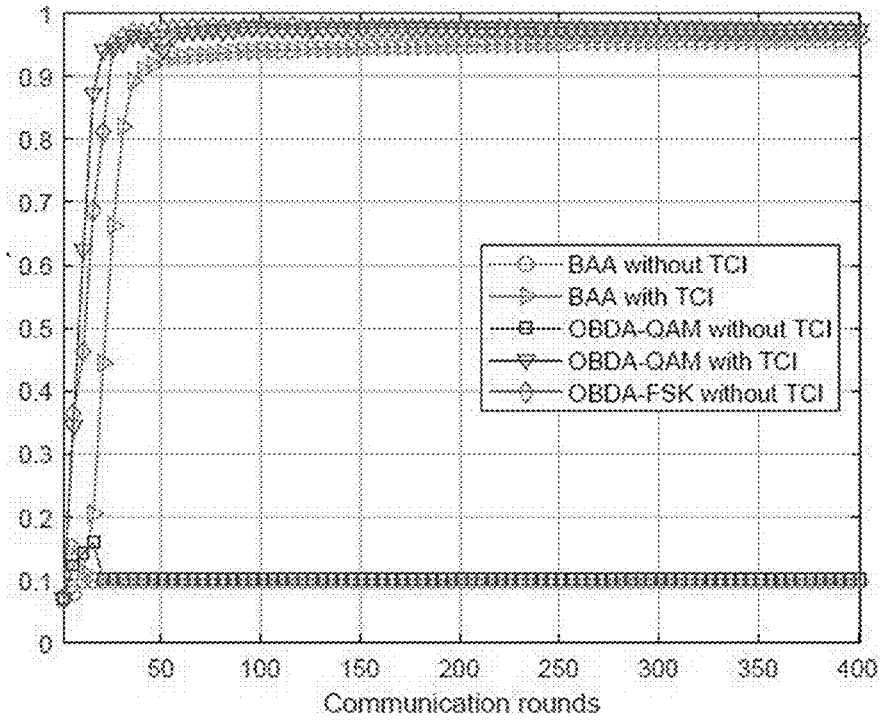
Figure 3G:
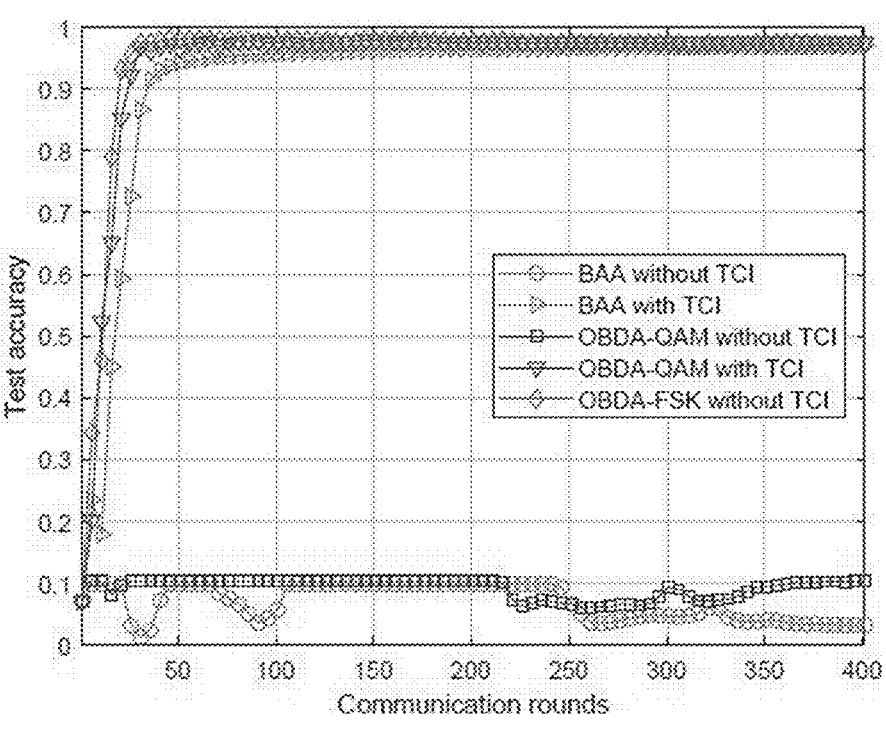
Figure 4A:
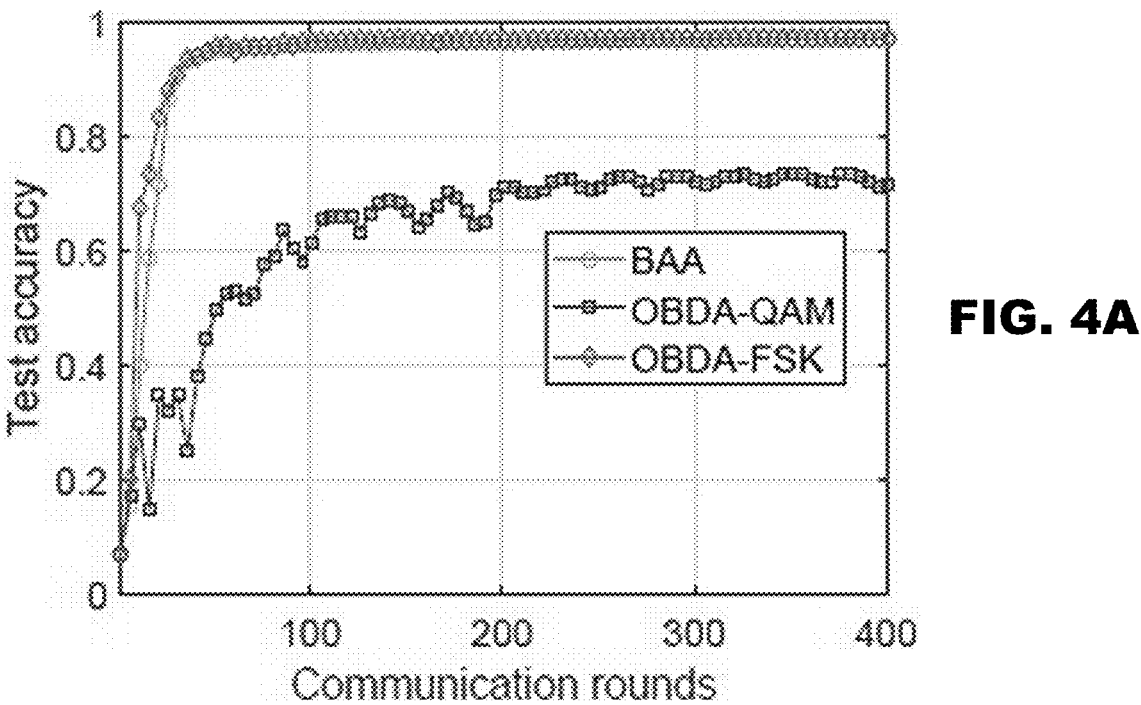
FIGS. 4A-4H show test accuracy results for non-IID data, where the FEEL with the OBDA-FSK converges without the CSI in both AWGN and fading channel.
Figure 4B:
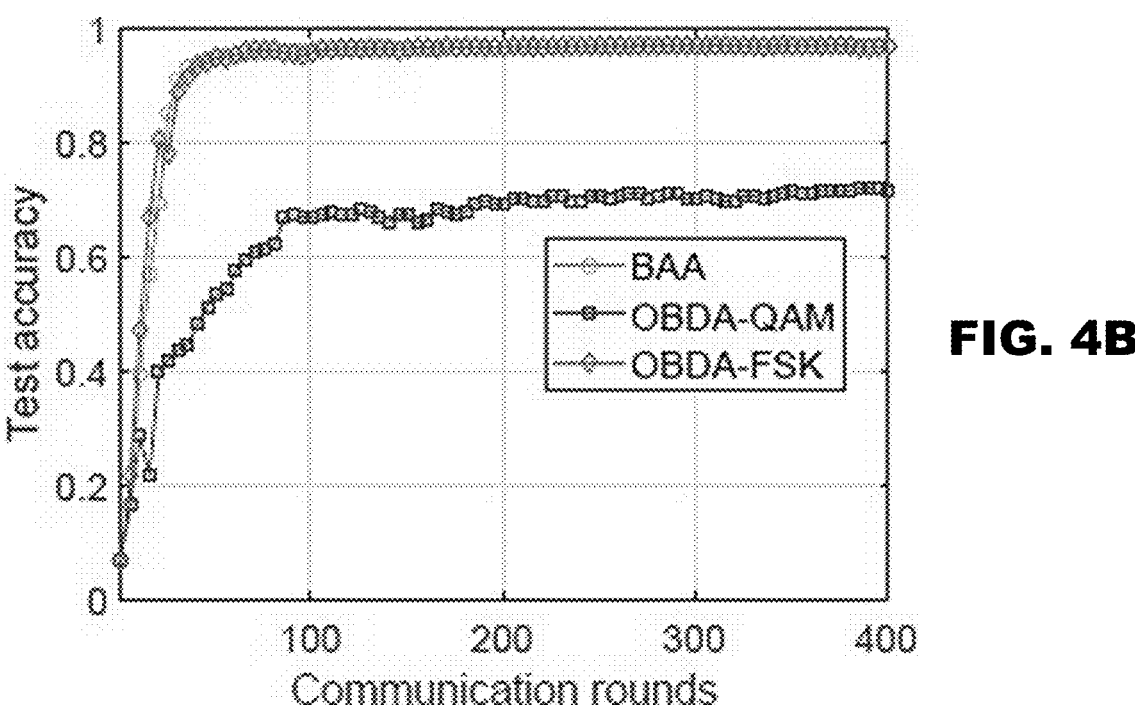
Figure 4C:
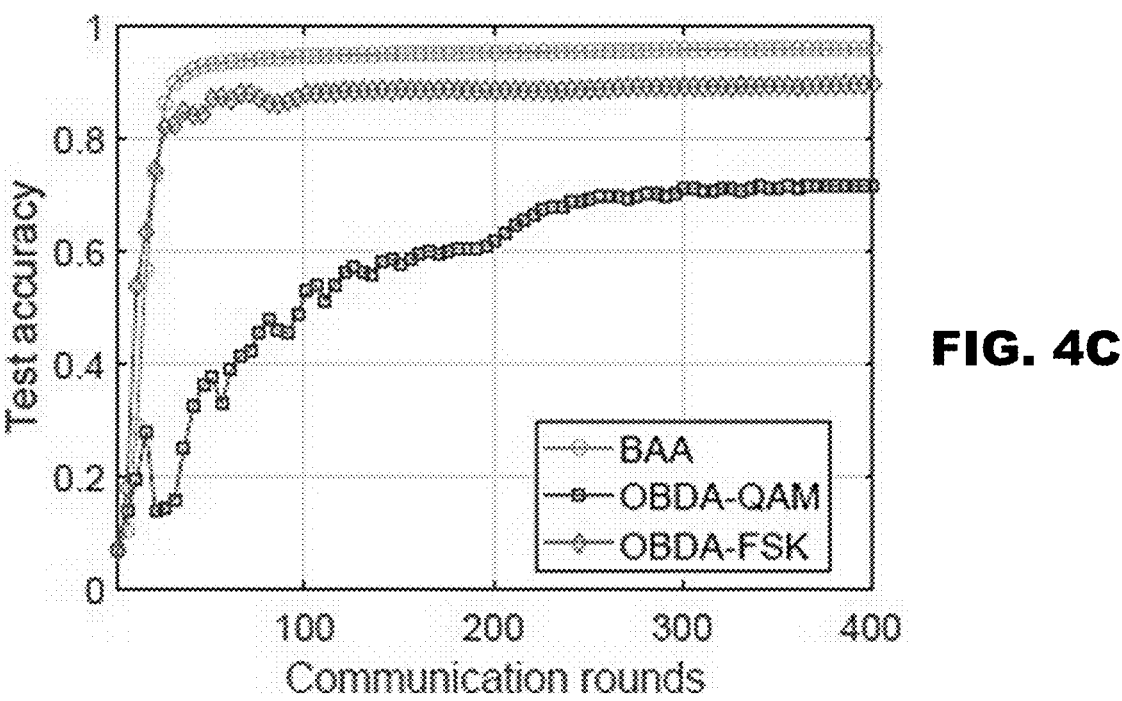
Figure 4D:
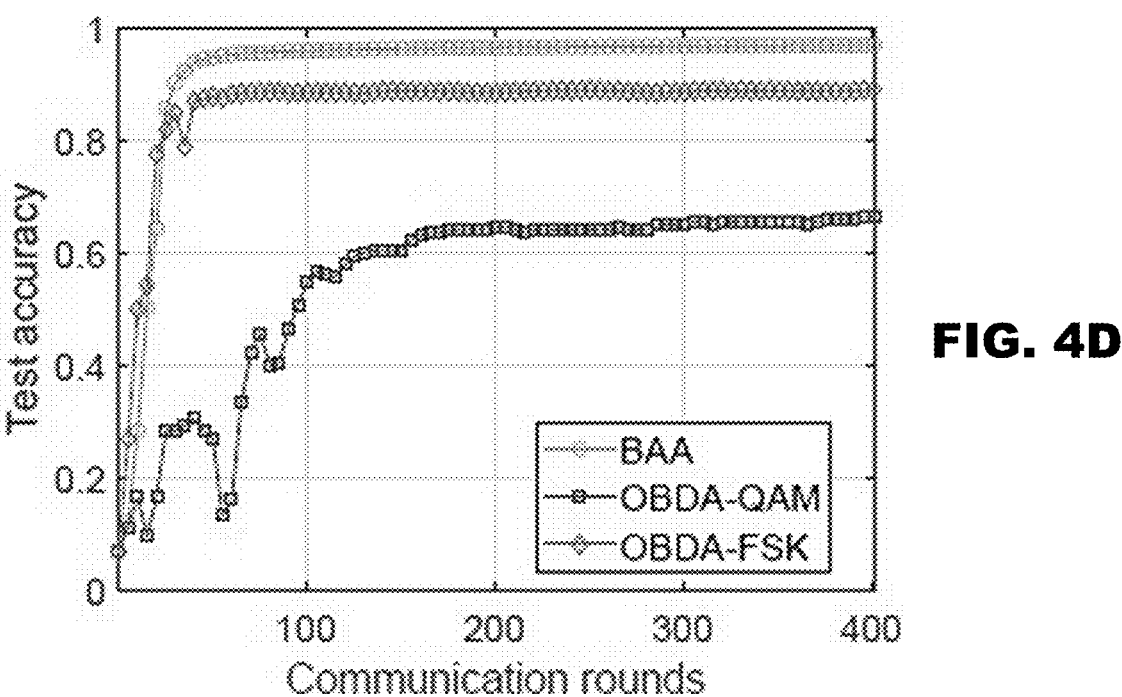
Figure 4E:
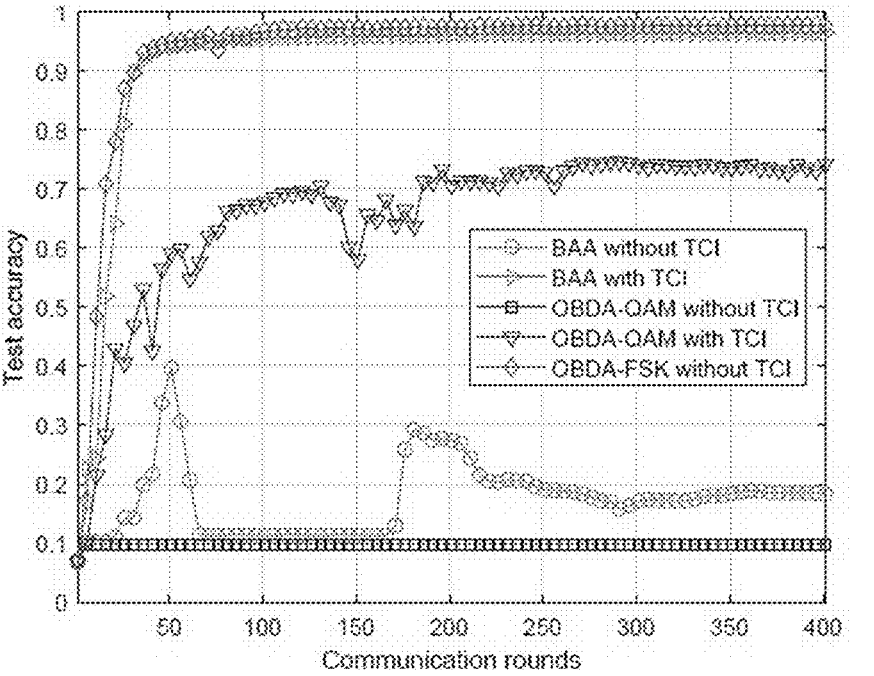
Figure 4F:
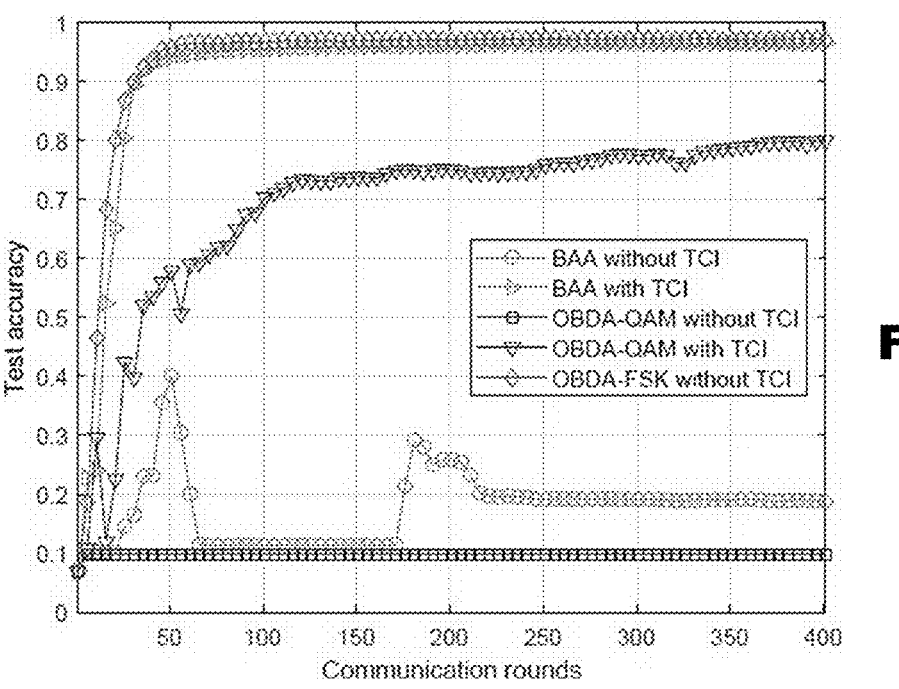
Figure 4G:
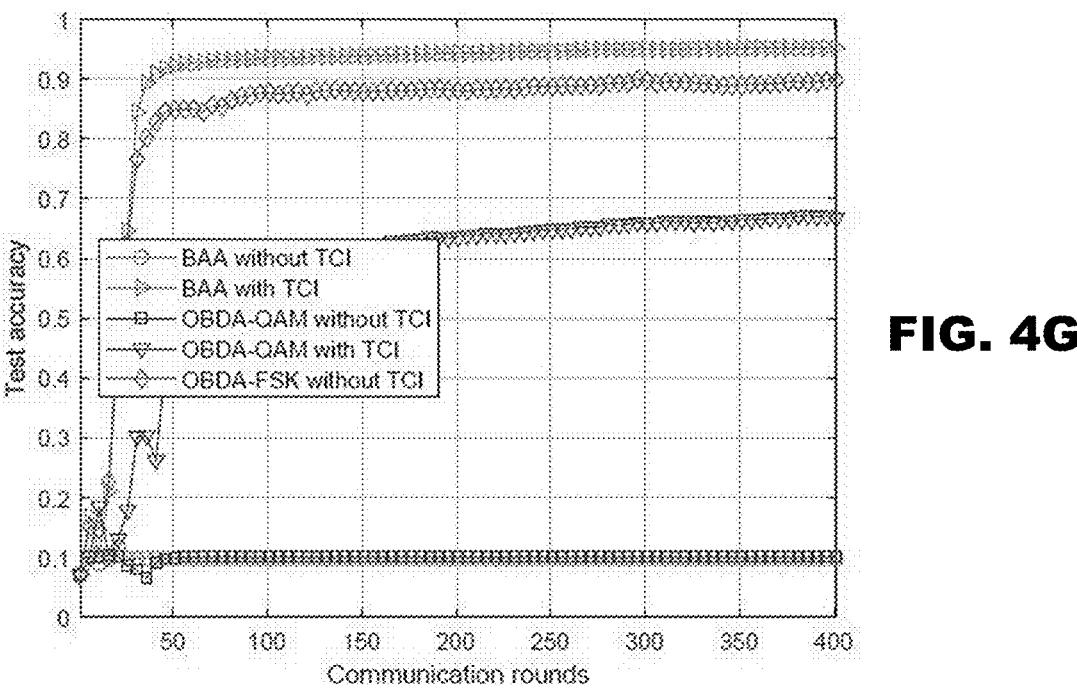
Figure 4H:
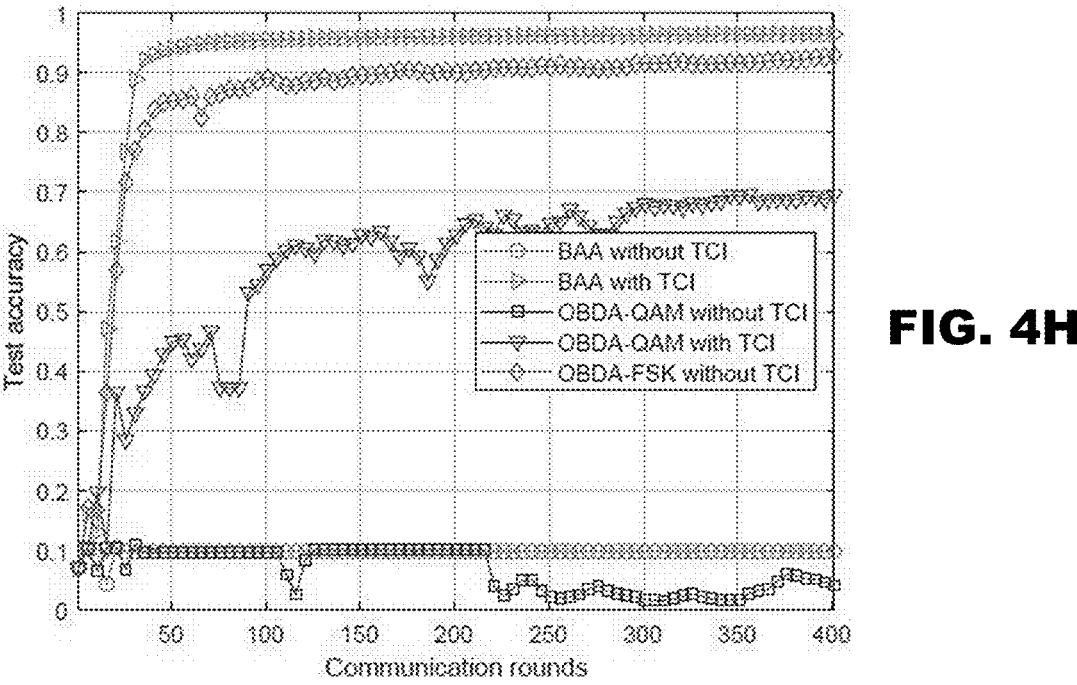

In FIG. 1, we provided the transmitter and receiver block diagrams for a FEEL system with OBDA-FSK. We also exemplified OBDA-FSK for K=3, q=5, M=10, and S=1 in FIG. 2. Assume that $\tilde{g}_1^{(n)}=(1,1,-1,-1,-1)$, $\tilde{g}_2^{(n)}=(1,-1,0,0,0)$, and $\tilde{g}_3^{(n)}=(-1,1,1,-1,0)$. Therefore, based on Eqs. (7) and (8), the symbols on the subcarriers can be calculated as $\sqrt{2}$ $(s_{1,0}, 0, s_{1,1}, 0, 0, s_{1,2}, 0 \ s_{1,3}, 0, s_{1,4})$, $\sqrt{2}$ $(s_{2,0}, 0, 0, s_{2,1}, 0, 0, 0, 0, 0, 0)$, and $\sqrt{2}$ $(0, s_{3,0}, s_{3,1}, 0, s_{3,2}, 0, 0, s_{3,3}, 0, 0)$ for the first ED, the second ED, and the third ED, respectively. After each ED's signal passes through their own multipath channels, the ES observes the superposed symbols on the same subcarrier indices. The detector at the ES then compares the energies on the two adjacent subcarriers to determine the gradient vector, i.e., $v^{(n)}=(v_0^{(n)}, \ldots, v_4^{(n)})$ based on Eq. (11). For example, since the majority of the EDs (e.g., ED 1 and ED 2) activates the first subcarrier for i=0, it is likely that the detector returns $v_0^{(n)}=1$ based on Eqs. (9) and (10). In the case of a tie, e.g., $v_2^{(n)}$, the detector determines the MV as 0. Note that the energy on the subcarriers is unlikely to be identical in practice due to the noise, randomization symbols, and channel. Hence, we set the MV to 0 if the distance between $|r_{l_0 m_0}|^2$ and $|r_{l_1}^{m_1}|^2$ is less than t.

C. Trade-offs and Comparisons

As prior literature approaches are opposed[6], [7], the proposed scheme does not need channel inversions at the EDs. From this aspect, it is compatible with time-varying channels (e.g., mobile networks[14]) and does not lose gradient information due to TCI. On the other hand, it quadruples the number of time-frequency resources for Air-Comp as compared to OBDA-QAM[7]; however, OBDA-QAM is not investigated in terms of PMEPR in the literature. As shown in, OBDA-QAM can suffer from high PMEPR, while the proposed scheme reduces PMEPR with a simple randomization technique that also leads to better accuracy results for non-IID data. As compared to approaches indicated in prior literature[11], [12], the proposed scheme also does not require CSI at the ES or multiple antennas.

Numerical Results

For the numerical results, we considered the learning task of handwritten digit recognition with a FEEL system and compared the proposed scheme with BAA[6] for gradient averaging and OBDA-QAM[7]. We used the MNIST dataset that contains 60,000 labelled handwritten digit images sized 28×28, from 0-9. From the IID dataset, we randomly partition 20,000 training images into equal shares to $K \in \{10, 50\}$ EDs. For the non-IID data set, we chose 5 digits for each ED and selected the images randomly, i.e., different dataset can contain the same image. For a fair comparison, we used the same data randomization for different AirComp schemes.

For the model, we considered a convolution neural network (CNN) that includes one 5×5 and two 3×3 convolutional layers, where each of them is followed by a batch normalization layer and rectified-linear unit (ReLU) activation following each of them. All convolutional layers have 20 filters. After the third ReLU, a fully connected layer with 10 units and a softmax layer were utilized. At the input layer, no normalization was applied. Our model has q=123090 learnable parameters, which corresponds to S=206, S=103, and S=52 OFDM symbols for the OBDA-FSK, BAA, and OBDA-QAM for M=1200, respectively. The subcarrier spacing was set to 15 kHz, the TCI (the truncation threshold) was 0.2, and the threshold t was set to 0.01 for the proposed scheme.

To test the FEEL, we considered two different uplink signal-to-noise ratios (SNRs), i.e., 0 dB and 20 dB.

For the fading channel, we considered ITU Extended Pedestrian A (EPA) with no mobility and then regenerated the channels between the ES and the EDs to capture the long-term channel variations for each communication round. For TCI, we assumed that CSI was available at the EDs. For the update rule, we considered stochastic gradient descent with momentum, where the momentum is 0:9. The initial learning rate was 0:01 and the learning rate decayed with a rate of 0:05 for every communication round.

In FIG. 3, we provided the test accuracy results for IID data. In AWGN channel, all AirComp schemes converged and returned a high score for both 0 dB and 20 dB SNR for K=10 and K=50 EDs as shown in FIGS. 3A-D. The test accuracy with the BAA slowly converged as compared to the OBDA-QAM and the OBDA-FSK, as the BAA is based on the actual values of the gradient estimates. In FIGS. 3E-F, we considered the fading channel for K=50 EDs. Both BAA and OBDA-QAM failed when the TCI is not used at the EDs. On the other hand, the OBDA-FSK offers a high-test accuracy without using TCI at the EDs or CSI at the ES. Similar behaviors for K=10 EDs were noted in FIGS. 3G-H.

FIG. 4 demonstrates test accuracy results for the non-IID data. In AWGN channel, both BAA and OBDA-FSK were better than the OBDA-QAM, as shown in FIGS. 4A-D. Based on these tests, the superiority of the OBDA-FSK to the OBDA-QAM is due to the randomization symbols that alter the MV. For example, although $\mathbb{E}[|r_{l_0 m_0}|^2] > \mathbb{E}[|r_{l_1 m_1}|^2]$ for $K_0 > K_1$, $|r_{l_1 m_1}|^2 > |r_{l_0 m_0}|^2 + t$ can still occur since $r_{l_0}$ and $r_{l_1}$ are the summations of the randomization symbols. This random behavior may avoid converging a local optimum for non-IID data. In fading channel, the proposed scheme also works without TCI as shown in FIGS. 4E-H and the test accuracy converges faster than the one with OBDA-QAM.

Figure 5:
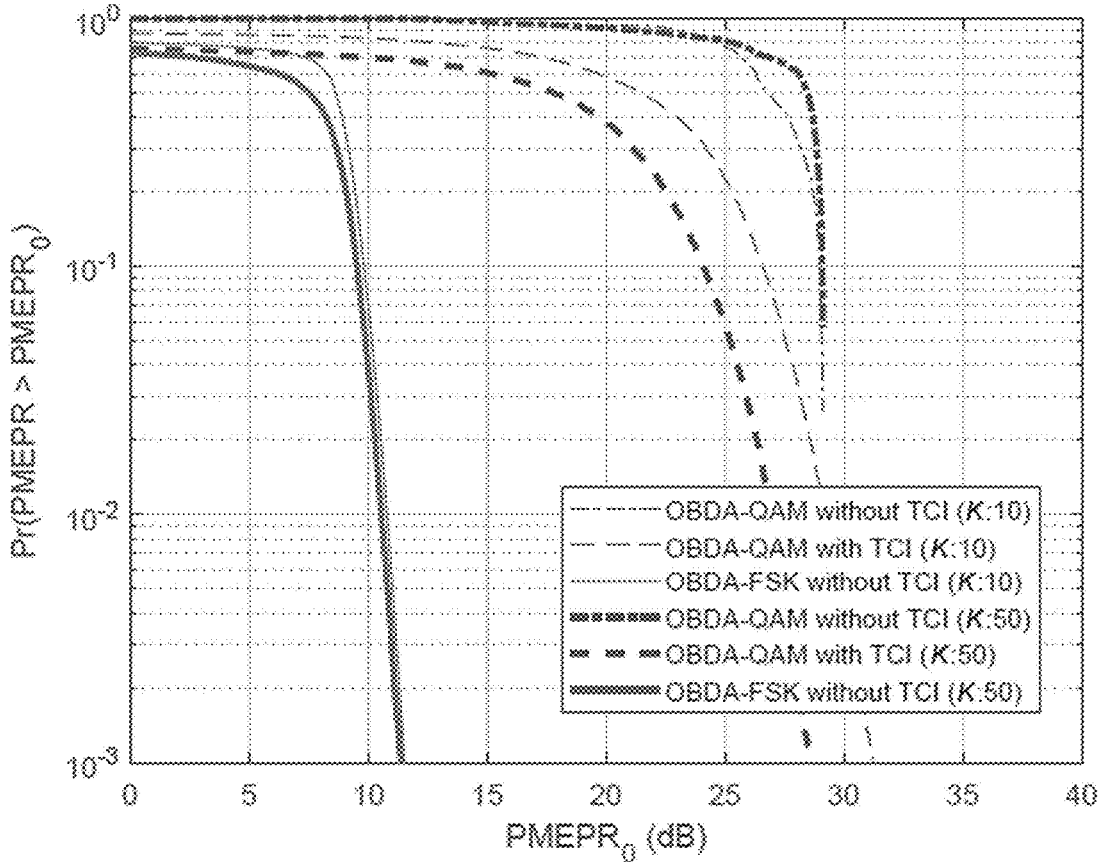
FIG. 5 illustrates peak-to-mean envelope power ratio (PMEPR) distributions, where the randomization symbols in OBDA-FSK lowers PMEPR.

In FIG. 5 (PMEPR distributions), we compared the PMEPR of the digital aggregation schemes (i.e., OBDA-QAM and OBDA-FSK) for different numbers of EDs and the IID data in fading channel and 20 dB SNR. The randomization symbols in OBDA-FSK lowered PMEPR. Since the proposed scheme introduces randomness in the frequency based on $s_{k,i}$ for i=0, . . . , q–1, the proposed scheme exhibits a similar behavior to a typical OFDM transmission in terms of PMEPR. On the other hand, the OBDA-QAM with or without TCI caused substantially high PMEPR for OFDM as the signs of the gradient and the channel coefficients in the frequency domain were correlated.

Concluding Remarks

In this disclosure, we proposed an AirComp scheme for FEEL. The proposed scheme relies on MV and forms the options for voting on different subcarriers and/or OFDM symbols, and thus, it allows the receiver to detect MV with a non-coherent detector and eliminates the need for TCI at the EDs as it is compatible with time-varying channels. Further, it can be used along with randomization methods in the frequency domain to reduce the PMEPR. Through simulations, we demonstrated that the proposed method provides a high-test accuracy in fading channel for both IID and non-IID data, which results in an acceptable PMEPR distribution at the expense of a larger number of time and frequency resources.

The proposed method can be improved in various ways. For example, to lower PMEPR further, the randomization symbols can be designed based on the gradients. The precoded-OFDM (e.g., discrete Fourier transform (DFT)-spread OFDM) or various mapping strategies can also be explored to improve the proposed method. In this disclosure, we focused on one-bit quantitation. Extending the proposed concept to different quantization levels is another interesting research direction that can be pursued. The system-level analysis of the proposed method with heterogeneous data is also another direction that can be investigated.

ADDITIONAL DISCLOSURE

Federated edge learning (FEEL) is an implementation of federated learning (FL) in a wireless network to train a model without moving the local data generated at the edge devices (EDs) to an edge server (ES)[001], [002]. With FEEL, a large number of model parameters (or gradients) needs to be communicated between many EDs and the ES through wireless channels. However, typical user multiplexing methods such as orthogonal frequency division multiple access (OFDMA) can be inefficient to address the spectrum congestion due to a large number of EDs[003]. To address this issue, one of the promising solutions is to perform the calculations needed for FEEL, e.g., averaging, with an over-the-air computation (AirComp) method that harnesses the signal-superposition property of the wireless-multiple access channel[004]-[006]. However, developing an AirComp scheme is not a trivial task due to the multipath channel, power misalignment, and time-synchronization errors in practice. Also, the channel state information (CSI) needs to be available at the EDs or the ES with state-of-the-art solutions. In this study, we propose an AirComp scheme to address these issues.

In the literature, various AirComp schemes are proposed for FEEL. In [007], analog modulation over orthogonal frequency division multiplexing (OFDM) is investigated for broadband analog aggregation (BAA). Particularly, it is proposed to modulate the OFDM subcarriers with the model parameters at the EDs. To overcome the impact of the multipath channel on the transmitted signals, the symbols on the OFDM subcarriers are multiplied with the inverse of the channel coefficients and the subcarriers that fade are excluded from the transmissions, which is known as truncated-channel inversion (TCI) in the literature. In [008], an additional time-varying precoder is applied along with TCI to facilitate the aggregation. In [009], it is proposed to sparsify the gradient estimates and project the resultant sparse vector into a low-dimensional vector to reduce the bandwidth. The compressed data is transmitted with BAA. In [010], one-bit broadband digital aggregation (OBDA) is proposed to facilitate the implementation of FEEL for a practical wireless system. In this method, considering distributed training by majority vote (MV) with the sign stochastic gradient descend (signSGD)[011], the EDs transmit quadrature phase-shift keying (QPSK) symbols over OFDM subcarriers along with TCI, where the real and imaginary parts of the QPSK symbols are formed by using the signs of the stochastic gradients, i.e., votes. At the ES, the signs of the real and imaginary components of the superposed received symbols on each subcarrier are calculated to obtain the MV for the sign of each gradient. However, the EDs still need the CSI for TCI as in BAA for AirComp. In [012] and [013], blind EDs are considered. However, it is assumed that the CSI for each ED is available at the ES. The impact of the channel on AirComp is mitigated through beamforming with a large number of antennas.

In this study, we investigate an AirComp method based on non-coherent detection to achieve FEEL without using CSI at the EDs and the ES. Inspired by the MV with signSGD[011], we use orthogonal resources, i.e., multiple subcarriers and/or OFDM symbols, to transmit the signs of local stochastic gradients. Hence, the votes from different EDs accumulate on the orthogonal resources non-coherently in fading channel with the proposed scheme. The ES then obtains the MV with an energy detector. Considering the randomness in the detected MVs due to the fading channel, path loss, and power control in the cell, we prove the convergence of learning in the presence of the proposed scheme for a non-convex loss function. We demonstrate that the proposed approach is robust against time-synchronization errors and power misalignment at the ES. We also show that it can be used with well-known peak-to-mean envelope power ratio (PMEPR) reduction techniques as it does not utilize the amplitude and the phase to encode the sign of local stochastic gradients. Finally, we evaluate the scheme by considering independent and identically distributed (IID) data and non-IID data where the data distribution is a function of the locations of EDs.

Notation: The complex and real numbers are denoted by $\mathbb{C}$ and $\mathbb{R}$, respectively. $\mathbb{C}[\cdot]$ is the expectation of its argument. $\mathbb{1}[\cdot]$ is the indicator function and $\mathbb{P}[\cdot]$ is the probability of its argument. The sign function is denoted by sign($\cdot$) and results in 1, $-1$, or $+1$ at random for a positive, a negative, or a zero-valued argument, respectively.

System Model

A. Scenario

Consider a wireless network with K EDs that are connected to an ES, where each ED and the ES are equipped with single antennas. We assume that the frequency synchronization in the network is done before the transmissions with a control mechanism as done in 3GPP Fourth Generation (4G) Long Term Evolution (LTE) and/or Fifth Generation (5G) New Radio (NR) with random-access channel (RACH) and/or physical uplink control channel (PUCCH) [014]. In this study, we consider the fact that the time synchronization among the EDs is not ideal, and the maximum difference between the time of arrivals of the EDs signals at the ES location is $T_{sync}$ seconds and it is equal to the reciprocal to the signal bandwidth.

In this study, we assume that the power alignment at the ES can be imperfect and the level of misalignment is controlled with a power control mechanism. We assume that the signal-to-noise ratio (SNR) of an ED at the ES is $1/\sigma_n^2$ the reference distance $R_{ref}$. We then set the received signal power of the kth ED at the ES as $$P_k = \left(\frac{r_k}{R_{ref}}\right)^{-(\alpha-\beta)} \tag{1}$$

where $r_k$ is the link distance between the kth ED and the ES, $\alpha$ is the path loss exponent, and $\beta \in [0,\alpha]$ is a coefficient that determines the amount of the path loss compensated. While $\beta=0$ means that there is no power control in the network, $\beta=\alpha$ leads to a system with perfect power alignment at the ES. We define the effective path loss exponent $\alpha_{eff}$ as $\alpha_{eff} \triangleq \alpha-\beta$.

In this study, we assume that the EDs are deployed in a cell, where the cell radius is $R_{max}$ meters and the minimum distance between the ES and the EDs is $R_{min}$ meters for $R_{min} \geq R_{ref}$. It is worth emphasizing that we do not consider the impact of multiple cells (e.g., inter-cell interference) or a more complicated large-scale channel model (e.g., shadowing) on learning in this work as our goal is to provide insights into the impact of power misalignment and the path loss on distributed learning with a tractable analysis.

B. Signal Model

In this study, for AirComp, the EDs access the wireless channel on the same time-frequency resources simultaneously with S OFDM symbols consisting of M active subcarriers. We assume that the cyclic prefix (CP) duration is larger than $T_{sync}$ and the maximum-excess delays of the channel between the ES and the EDs. Considering independent frequency-selective channels between the EDs and the ES, the superposed symbol on the lth subcarrier of the mth OFDM symbol at the ES for the nth communication round of FEEL can be written as $$r_{l,m}^{(n)} = \sum_{k=1}^{K} \sqrt{P_k}\, h_{k,l,m}^{(n)} t_{k,l,m}^{(n)} + n_{l,m}^{(n)} \tag{2}$$

where $h_{k,l,m}^{(n)} \in \mathbb{C}$ is the channel coefficient between the ES and the kth ED, $t_{k,l,m}^{(n)} \in \mathbb{C}$ is the transmitted symbol from the kth ED, and $n_{l,m}^{(n)}$ is the symmetric additive white Gaussian noise (AWGN) with zero mean and the variance $\sigma_n^2$ on the lth subcarrier for $l \in \{0, 1, \ldots, M-1\}$ and $m \in \{0, 1, \ldots, S-1\}$.

We consider the fact that the time synchronization at the receiver may not be precise. To model this, we assume that the synchronization point where the discrete Fourier transform (DFT) starts can deviate by $N_{err}$ samples within the CP window. Note that the uncertainty of the synchronization point within the CP window is often not an issue for traditional communications due to the channel estimation. However, it can cause a non-negligible impact on AirComp.

Let $x(t_{time}) \in \mathbb{C}$ be a baseband OFDM symbol in continuous time for $t_{time} \in [0, T_s)$, where $T_s$ is the OFDM symbol duration. We define the PMEPR of an OFDM symbol as $$\max_{t_{time} \in [0, T_s)} \frac{|x(t_{time})|^2}{P_{tx}},$$

where $P_{tx} = \mathbb{E}[|x(t_{time})|^2]$ is the mean-envelope power.

C. Learning Model

Let $\mathcal{D}_k$ denote the local data containing labeled data samples at the kth ED as $\{(\mathbf{x}_\ell, y_\ell)\} \in \mathcal{D}_k$ for $k=1, \ldots, K$, where $\mathbf{x}_\ell$ and $y_\ell$ are $\ell$th data sample and its associated label, respectively. The centralized learning problem can be expressed as $$w^* = \arg\min F(w) = \arg\min \frac{1}{|\mathcal{D}|} \sum_{\forall (x,y) \in \mathcal{D}} f(w, x, y) \tag{3}$$

where $\mathcal{D} = \mathcal{D}_1 \cup \mathcal{D}_2 \cup \ldots \cup \mathcal{D}_K$ and $f(w, x, y)$ is the sample loss function that measures the labeling error for $(x, y)$ for the parameters $w = [w_1 \ldots, w_q]^T \in \mathbb{R}_q$, and $q$ is the number of parameters. With full-batch gradient descend, a local optimum point can be obtained as $$w^{(n+1)} = w^{(n)} - \eta g^{(n)} \tag{4}$$

where $\eta$ is the learning rate and $$g^{(n)} = \nabla F(w^{(n)}) = \frac{1}{|\mathcal{D}|} \sum_{\forall (x,y) \in \mathcal{D}} \nabla F(w^{(n)}, x, y) \tag{5}$$

where ith element of the vector $g^{(n)}$ is the gradient of $F(w^{(n)})$ with respect to $w_i^{(n)}$.

In [011], in the context of parallel processing, distributed training by MV with signSGD is investigated to solve (3). In this method, for the nth communication round, the kth ED[1] first calculates the local stochastic gradient as $$\tilde{g}_k^{(n)} = \nabla F_k(w^{(n)}) = \frac{1}{n_b} \sum_{\forall (x_\ell, y_\ell) \in \tilde{\mathcal{D}}_k} \nabla f(w^{(n)}, x_\ell, y_\ell) \tag{6}$$

where $\tilde{\mathcal{D}}_k \subset \mathcal{D}_k$ is the selected data batch from the local data set and $n_b = |\tilde{\mathcal{D}}_k|$ as the batch size. Instead of the actual values of local gradients, the EDs then send the signs of their local stochastic gradients, denoted as $\tilde{g}_k^{(n)}$ for $k=1, \ldots, K$, to the ES, where the ith element of the vector $\tilde{g}_k^{(n)}$ is $\tilde{g}_{k,i}^{(n)} \triangleq \text{sign}(\tilde{g}_{k,i}^{(n)})$. The ES obtains the MV for the ith gradient as $$v_i^{(n)} \triangleq \text{sign}\left( \sum_k^K \tilde{g}_{k,i}^{(n)} \right) \tag{7}$$

Subsequently, the ES pushes $v^{(n)} = [v_1^{(n)}, \ldots, v_q^{(n)}]^T$ to the EDs and the models at the EDs are updated as

[1] We refer to the workers and parameter-server mentioned in [011] as EDs and ES, respectively, to describe distributed training by MV with signSGD.

$$w^{(n+1)} = w^{(n)} - \eta v^{(n)} \tag{8}$$

This procedure is repeated consecutively until a predetermined convergence criterion is achieved.

For FEEL, the optimization problem can also be expressed as (3) in a scenario where the local data samples and their labels are not available at the ES and the link between an ED and the ES experiences independent frequency-selective fading channel. To solve (3) under these constraints, in this study, we adopt the same procedure summarized for the distributed training by the MV. With the motivations of eliminating the latency caused by orthogonal multiple access and enabling distributed training in mobile wireless networks, we propose a simple-but-effective Air-Comp scheme to detect the MV in fading channel without using CSI at the EDs and the ES.

FSK-Based Majority Vote

A. Edge Device—Transmitter

With the proposed AirComp scheme, the EDs perform a low-complexity operation to transmit the signs of the gradients given in (6): Let $f$ be a bijective function that maps $i \in \{1, 2, \ldots, q\}$ to the distinct pairs $(m^+, l^+)$ and $(m^-, l^-)$ for $m^+, m^- \in \{0, 1, \ldots, S-1\}$ and $l^+, l^- \in \{0, 1, \ldots, M-1\}$. Based on the value of $\tilde{g}_{k,i}^{(n)}$, at the nth communication round, the kth ED calculates the symbol $t_{k,l^+,m^+}^{(n)}$ and $t_{k,l^-,m^-}^{(n)}$, $\forall i$, as $$t_{k,l^+,m^+}^{(n)} = \begin{cases} \sqrt{E_s} \times s_{k,i}^{(n)} & \tilde{g}_{k,i}^{(n)} = 1 \\ 0, & \tilde{g}_{k,i}^{(n)} = -1 \end{cases} \tag{9}$$

and $$t_{k,l^-,m^-}^{(n)} = \begin{cases} 0, & \tilde{g}_{k,i}^{(n)} = 1 \\ \sqrt{E_s} \times s_{k,i}^{(n)} & \tilde{g}_{k,i}^{(n)} = -1 \end{cases} \tag{10}$$

respectively, where $E_s = 2$ is a factor to normalize the symbol energy and $s_{k,i}^{(n)}$ is a randomization symbol on the unit circle. Therefore, to indicate the sign of a local stochastic gradient, our scheme dedicates two subcarriers with (9) and (10), as opposed to modulating the phase of a subcarrier as done in OBDA. Also, we do not use TCI to compensate the impact of multipath channel on transmitted symbols as our goal is to exploit the energy accumulation on two different subcarriers to detect the MV with a non-coherent detector.

As a special case of $f$, if $m^- = m^+$ and $l^- = l^+ + 1$ hold for all i, the adjacent subcarriers of $m^+$th OFDM symbol forms the options for a vote, which corresponds to frequency-shift keying (FSK) over OFDM subcarriers. In this case, the kth ED's vote for the ith gradient becomes independent from its choice since the adjacent subcarriers are likely to experience similar channel conditions, i.e., $h_{i,l^+}^{(n)} \approx h_{k,l^+,+1}^{(n)}$. We refer to the MV calculation with the proposed scheme under this specific mapping as FSK-based MV (FSK-MV) in this study.

After the calculations of $t_{k,l^+,m^+}^{(n)}$ and $t_{k,l^-,m^-}^{(n)}$ for all i and k, the EDs calculate the OFDM symbols and transmit them based on the discussions in Section II.

B. Edge Server—Receiver

The receiver at the ES observes the superposed symbols at all subcarriers as expressed in (2). By using the mapping function $f$, the superposed symbols for a given i can be shown as $$r_{l^+,m^+}^{(n)} = \sqrt{E_S} \sum_{\forall k, \mathcal{G}_{k,i}^{(n)}=1} \sqrt{P_k}\, h_{k,l^+,m^+}^{(n)} s_{k,i}^{(n)} + n_{l^+,m^+}^{(n)} \tag{11}$$

and $$r_{l^-,m^-}^{(n)} = \sqrt{E_S} \sum_{\forall k, \mathcal{G}_{k,i}^{(n)}=-1} \sqrt{P_k}\, h_{k,l^-,m^-}^{(n)} s_{k,i}^{(n)} + n_{l^-,m^-}^{(n)} \tag{12}$$

respectively. The receiver at the ES detects the MV for the ith gradient with an energy detector as $$v_i^{(n)} = \mathrm{sign}(\Delta_i^{(n)}) \tag{13}$$

where $\Delta_i^{(n)} \triangleq e_i^+ - e_i^-$ for $e_i^+ \triangleq |r_{l^+,m^+}^{(n)}|_2^2$ and $e_i^- \triangleq |r_{l^+,m^+}^{(n)}|_2^2$, $\forall i$. It is worth mentioning that we do not use any method to resolve the interference in (11) and (12) among the EDs as we are not interested in the sign of a local gradients. On the contrary, we exploit the interference for aggregation and compare the amount of energy on two different subcarriers to detect the MV in (13). The transmitter and receiver block diagrams are provided in FIG. 1, based on the aforementioned discussions.

The proposed scheme leads to a fundamentally different training strategy since it determines the correct MV in (7) probabilistically by comparing $e_i^+$ and $e_i^-$. To elaborate this, assume that the multipath channels between the ES and the EDs are independent. Let $K_i^+$ and $K_i^- = K - K_i^+$ be the number of EDs that vote for 1 and −1 for the ith gradient, respectively.

Lemma 1. $\mathbb{E}[e_i^+]$ and $\mathbb{E}[e_i^-]$ can be calculated as $$\mu_i^+ \triangleq \mathbb{E}[e_i^+] = E_s K_i^+ \lambda + \sigma_n^2 \tag{14}$$

and $$\mu_i^- \triangleq \mathbb{E}[e_i^-] = E_s K_i^- \lambda + \sigma_n^2 \tag{15}$$

respectively, where $$\lambda \triangleq \begin{cases} \dfrac{2R_{ref}^{\alpha_{eff}}}{R_{max}^2 - R_{min}^2} \dfrac{R_{min}^{2-\alpha_{eff}} - R_{max}^{2-\alpha_{eff}}}{\alpha_{eff} - 2} & \alpha_{eff} \neq 2 \\[2ex] \dfrac{2R_{ref}^{\alpha_{eff}}}{R_{max}^2 - R_{min}^2} \ln\dfrac{R_{max}}{R_{min}} & \alpha_{eff} = 2 \end{cases} \tag{16}$$

Proof: Since (11) is a weighted summation of independent complex Gaussian random variables with zero mean and unit variance (i.e., channel coefficients), $r_{l^+,m^+}^{(n)}$ is a zero mean random variable, where its variance is $$\mu_i^+ = \mathbb{E}[e_i^+] = \mathbb{E}\left[|r_{l^+,m^+}^{(n)}|_2^2\right] = \tag{17}$$

$$\mathbb{E}\left[E_s \sum_{\mathcal{G}_{k,i}^{(n)}=1} \left(\frac{r_k}{R_{ref}}\right)^{-\alpha_{eff}} + \sigma_n^2\right] = E_s K_i^+ \mathbb{E}\left[\left(\frac{r_k}{R_{ref}}\right)^{-\alpha_{eff}}\right] + \sigma_n^2.$$

To calculate (17), we need to calculate the expected value of $y = r^{-\alpha_{eff}}$. Assuming that the EDs are localized uniformly within the cell, the link distance distribution can be expressed as $$f(r) = \frac{2r}{R_{max}^2 - R_{min}^2} \tag{18}$$

Hence, the distribution of y can obtained as $$f(y) = \frac{f(r)}{\left|\dfrac{dy}{dr}\right|}\Bigg|_{r=y^{-\frac{1}{\alpha_{eff}}}} = \frac{2y^{-\frac{\alpha_{eff}+2}{\alpha_{eff}}}}{\left(R_{max}^2 - R_{min}^2\right)\alpha_{eff}} \tag{19}$$

By using (19), the expected value of y can be calculated as (16). The same analysis can be done for $\mu_i^-$.

Figure 6A:
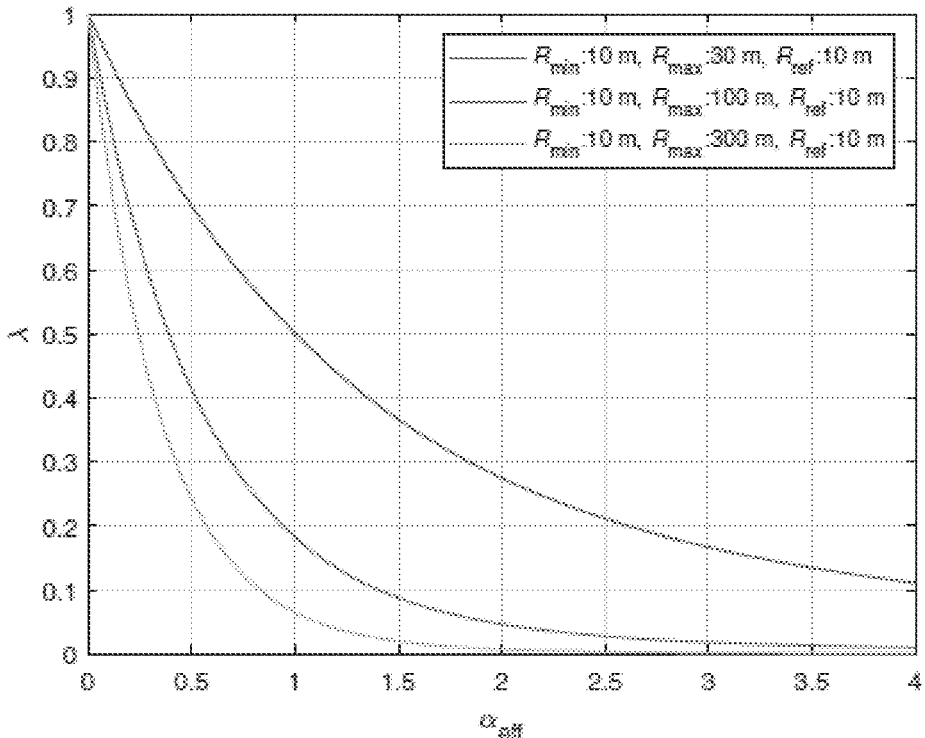
FIG. 6A graphically illustrates the impact of cell size and the effective path loss exponent on $\lambda$.

Based on Lemma 1, (13) is likely to obtain the correct MV because $\mu_i^+$ and $\mu_i^-$ are linear functions of and $K_i^+$ and $K_i^-$, respectively. However, the detection performance depends on the parameter $\lambda \in [0, 1]$ that captures the impacts of power control, path loss, and cell size on $e_i^+$ and $e_i^-$. In FIG. 6A, we plot $\lambda$ for different cell sizes for a given $\alpha_{eff}$. For a better power control or a smaller cell size, the parameter $\lambda$ increases to 1, which implies a better detection performance under noise. On the other hand, the MV is not deterministic for $\sigma_n^2 = 0$. Hence, the convergence for a non-convex loss function F(w) needs to be shown to justify if the proposed scheme is suitable for FEEL.

C. Convergence in Fading Channel

We consider several standard assumptions made in the literature for the convergence analysis[10], [11]:

Assumption 1 (Bounded loss function). $F(w) \geq F^*$, $\forall w$.

Assumption 2 (Smoothness). Let g be the gradient of F(w) evaluated at w. For all w and w', the expression given by $$\left|F(w') - \left(F(w) - g^T(w' - w)\right)\right| \leq \frac{1}{2}\sum_{i=1}^{q} L_i(w_i' - w_i)^2$$

holds for a non-negative constant vector $L = [L_1, \ldots, L_q]^T$.

Assumption 3 (Variance bound). The stochastic gradient estimates $\{\tilde{g}_k = [\tilde{g}_{k,1}, \ldots, \tilde{g}_{k,q}]^T = \nabla F_k(w^{(n)})\}$, $\forall k$, are independent and unbiased estimates of $g = [g_1, \ldots, g_q]^T = \nabla F(w)$ with a coordinate bounded variance, i.e., $$\mathbb{E}[\tilde{g}_k] = g, \forall k \tag{20}$$

$$\mathbb{E}[(\tilde{g}_{k,i} - g_i)^2] \leq \sigma_i^2/n_b, \forall k, i \tag{21}$$

where is a non-negative constant vector.

Assumption 4 (Unimodal, symmetric gradient noise). For any given w, the elements of the vector $\tilde{g}_k$, $\forall k$, has a unimodal distribution that is also symmetric around its mean.

We also assume that the parameters $e_i^+$ and $e_i^-$ are exponential random variables, where their means are $\mu_i^+$ and $\mu_i^-$, respectively. This assumption holds true when the power control is ideal under IID Rayleigh fading. It is a weak assumption under imperfect power control due to the central limit theorem.

By extending our theorem in [015] with the considerations of path loss, power control, and cell size, the convergence rate in the presence of FSK-MV can obtained as follows:

Theorem 1. For $n_b = N/\gamma$ and $\eta = 1/\sqrt{\|L\|_1 n_b}$, the convergence rate of the distributed training by the MV based on FSK in fading channel is $$\mathbb{E}\left[\frac{1}{N}\sum^{N-}_{n=}\|g^{(n)}\|_1\right] \le \frac{1}{\sqrt{N}}\left(a\sqrt{\|L\|_1}\left(F(w^0)-F^*+\frac{\gamma}{2}\right)+\frac{2\sqrt{2}}{3}\sqrt{\gamma}\|\sigma\|_1\right) \quad (22)$$

where $\gamma$ is a positive integer, $$a = \left(1+\frac{2}{\xi K}\right)\frac{1}{\sqrt{\gamma}} \text{ for } \xi \triangleq \frac{E_s\lambda}{\sigma_n^2},$$

and $\lambda \in [0, 1]$ given in (16) is a parameter that captures the parameters related to the path loss, power control, and cell size.

FIG. 6A graphically illustrates the impact of cell size and the effective path loss exponent on $\lambda$.

The proof of Theorem 1 is given in the appendix.

Based on Theorem 1, we can infer the followings: 1) For a larger SNR (i.e., a larger $1/\sigma_n^2$) and a large number of EDs (i.e., a larger K), the convergence rate with FSK-MV in fading channel improves since $\alpha$ decreases. 2) The power control results in a better convergence rate since $\lambda$ increases with a lower $\alpha_{eff}$. 3) Another way of improving the convergence rate is to reduce to cell size, yielding a large $\lambda$ as illustrated in FIG. 6A. However, this indicates a practical limitation of a single-cell FEEL: The number of EDs may be smaller for a smaller cell. However, the power control becomes a harder task for a larger cell. 4) Finally, under ideal power control, the convergence rate becomes similar to the one with signSGD in an ideal channel[11, Theorem 1] asymptotically.

D. Comparisons

Robustness against Time-Varying Fading Channel: As opposed to the approaches in [007] and [010], the proposed scheme does not utilize the CSI for TCI at the EDs. Hence, it is compatible with time-varying channels (e.g., mobile networks[016]) and does not lose gradient information due to TCI. As a trade-off, it quadruples the number of time-frequency resources for AirComp as compared to OBDA in [010]. As compared to the approaches in [012] and [013], the proposed scheme also does not require CSI at the ES or multiple antennas.

2) Robustness against Time-Synchronization Errors: As demonstrated in Section IV, the proposed scheme provides immunity against the time-synchronization errors. This is because the timing misalignment among the EDs or the uncertainty on the receiver synchronization within the CP window cause phase rotations in the frequency domain and FSK-MV does not encode information on the amplitude or phase. Also, the proposed scheme does not use any channel-related information at the EDs and the ES. Hence, FSK-MV is more robust against time-synchronization errors as compared to OBDA.

3) Robustness against Power-Amplifier Non-linearity: The proposed scheme separates the options for voting over two different resources identified in time and frequency. Hence, it allows one to choose $s_{k,i}^{(n)}$ based on specific purposes. In this study, we use random QPSK symbol to reduce PMEPR by decreasing the correlation in the frequency domain[017]. OBDA is not investigated in terms of PMEPR in the literature. As shown in Section IV, OBDA can suffer from high PMEPR, while the proposed scheme reduces PMEPR with a simple randomization technique. Also, FSK-MV does not require a long transmission power constraint as in introduced for OBDA[010, Eq. 9 and Eq. 10]

since the $\ell_2$-norm of the OFDM symbols do not change as a function of CSI with FSK-MV.

Numerical Results

For the numerical results, we consider the learning task of handwritten-digit recognition in a single cell with K=50 EDs for $R_{min}$=10 meters and $R_{max}$=100 meters. We assume that the path loss exponent is $\alpha$=4. To demonstrate the impact of the imperfect power control on distributed learning, we choose $\beta \in \{2, 4\}$ and set the SNR, i.e., $1/\sigma_n^2$, to be 20 dB at $R_{ref}$=10 meters. The link distance between the kth ED and the ES is set to $r_k = \sqrt{R_{min}^2+(k-1)(R_{max}^2-R_{min}^2)/(K-1)}$ based on (18). For the fading channel, we consider ITU Extended Pedestrian A (EPA) with no mobility and regenerate the channels between the ES and the EDs independently for each communication round to capture the long-term channel variations. The subcarrier spacing is set to 15 kHz. We use M=1200 subcarriers (i.e., the signal bandwidth is 18 MHz). In the case of imperfect time synchronization, we assume that the difference between time of arriving ED signals is maximum $T_{sync}$=55.6 ns and the synchronization uncertainty at the ES is $N_{err}$=3 samples. Otherwise, these parameters are set to 0.

Figure 7A:
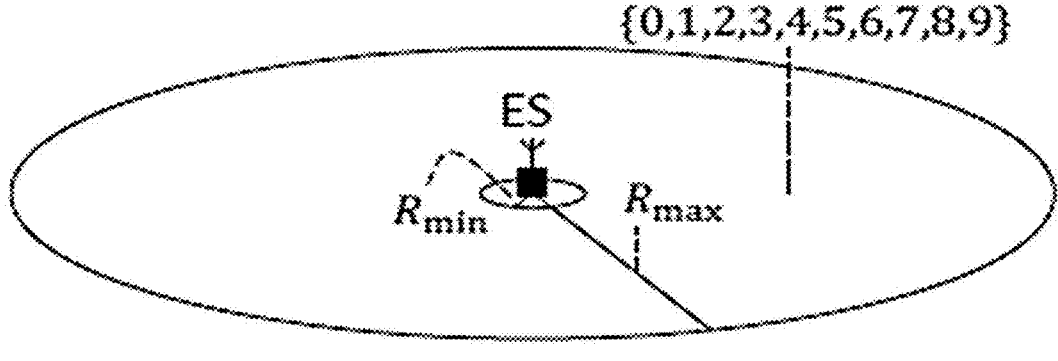
FIGS. 7A-7B, respectively, illustrate IID and non-IID data distributions.
Figure 7B:
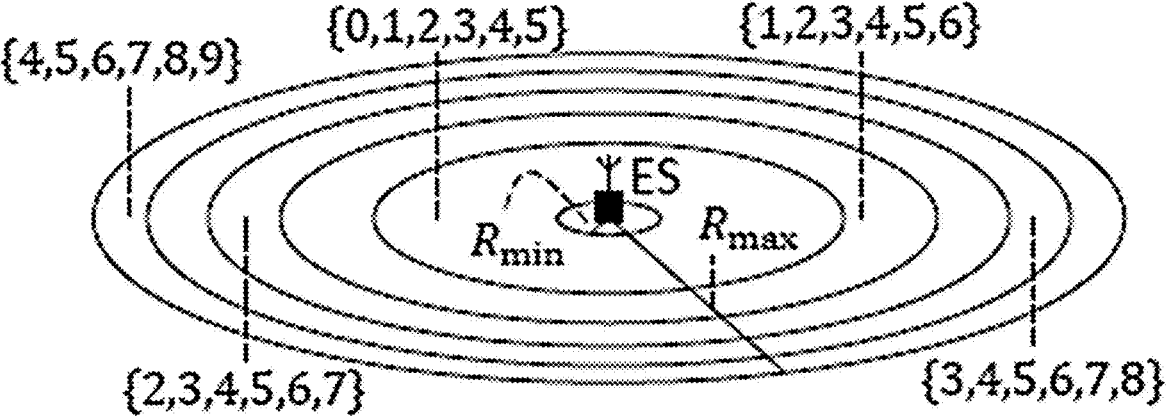

For the local data at the EDs, we use the MNIST database that contains labeled handwritten-digit images size of 28×28 from digit 0 to digit $9^2$. We consider both IID data and non-IID data in the cell. To prepare the data, we first choose $|\mathcal{D}|$=25000 training images from the database, where each digit has distinct 2500 images. For the scenario with the IID data, we assume that each ED has 50 distinct images for each digit. For the scenario with the non-IID data, we assume that the distribution of the images depends on the locations of the EDs to test the FEEL in a more challenging scenario. To this end, we divide the cell into 5 areas with concentric circles and the EDs located in uth area have the data samples with the labels $\{u-1, u, 1+u, 2+u, 3+u, 4+u\}$ for $u \in \{1, \ldots, 5\}$. Hence, the availability of the labels gradually changes based on the link distance. The areas between two adjacent concentric circles are identical and the number of EDs in each area is 10. The IID and non-IID data distributions are illustrated in FIGS. 7A and 7B, respectively. FIGS. 7A and 7B illustrate IID versus non-IID data considered for the numerical analyses. The radius of the concentric circles is $\{10, 45.6, 63.7, 77.7, 89.6, 100\}$ meters. In particular, FIG. 7A illustrates IID data in the cell. All EDs have data samples for 10 different digits. Further, FIG. 7B illustrates non-IID data in the cell. The available digits at the EDs change based on their locations in the cell. The digits in an area are shown in FIG. 7B.

$^2$ For FEEL, the data samples are generated at the EDs. We distribute the data samples in the MNIST database to the EDs to generate representative results for FEEL.

For the model, we consider a convolution neural network (CNN) that includes one 5×5 and two 3×3 convolutional layers, where each of them is followed by a batch normalization layer and rectified-linear unit (ReLU) activation follow each of them. All convolutional layers have 20 filters. After the third ReLU, a fully connected layer with 10 units and a softmax layer are utilized. At the input layer, no normalization is applied. Our model, outline in FIG. 6B (Table I), has q=123090 learnable parameters, which corresponds to S=206 and S=52 OFDM symbols for the FSK-MV and OBDA[10], respectively. For TCI, the truncation threshold is 0.2 and we assume that CSI is available at the EDs. For the update rule, the learning rate is set to 0.01. The batch size $n_b$ is set to 64. For the test accuracy calculations, we use 10000 test samples available in the MNIST database.

Figure 8A:
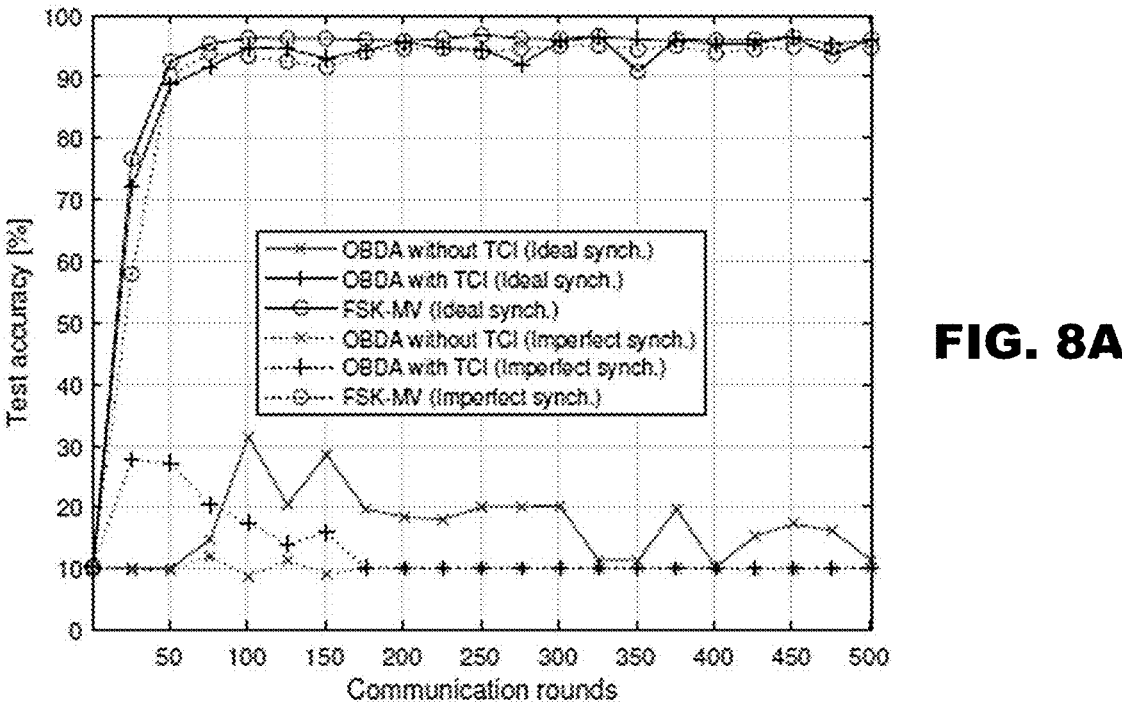
FIGS. 8A-8D illustrate test accuracy versus communication rounds, with FSK-MV works without the CSI at the EDs and ES and provide robustness against time-synchronization errors, and the test accuracy reduces more for non-IID when the power control is imperfect.
Figure 8B:
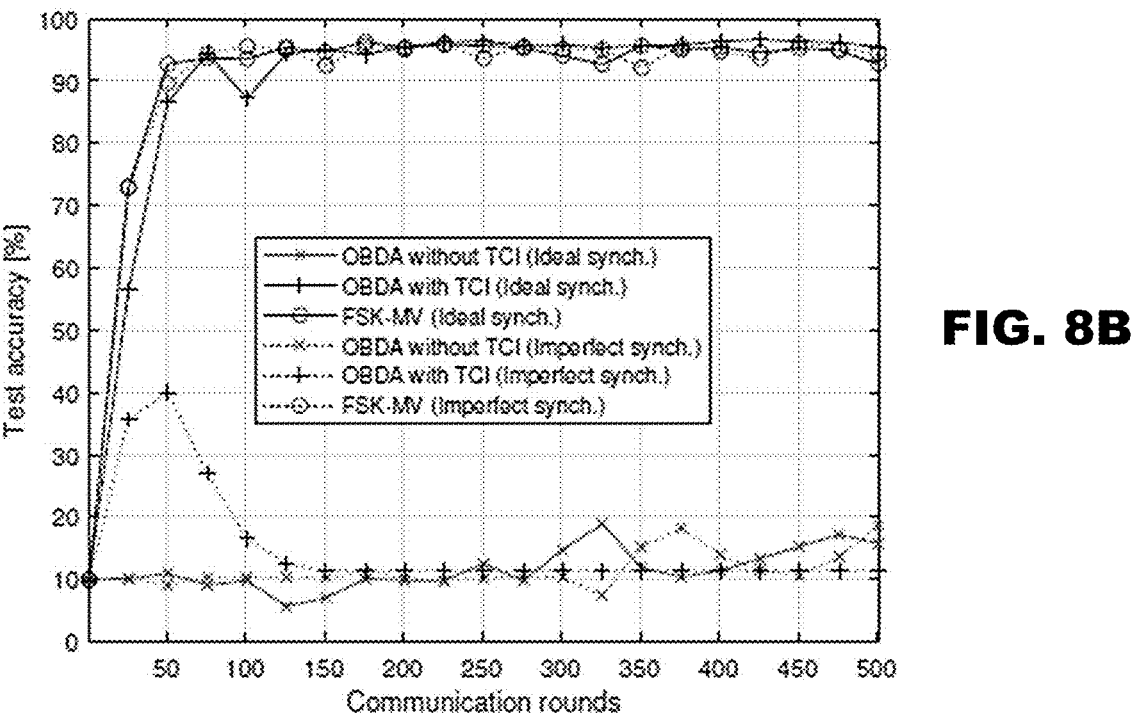
Figure 8C:
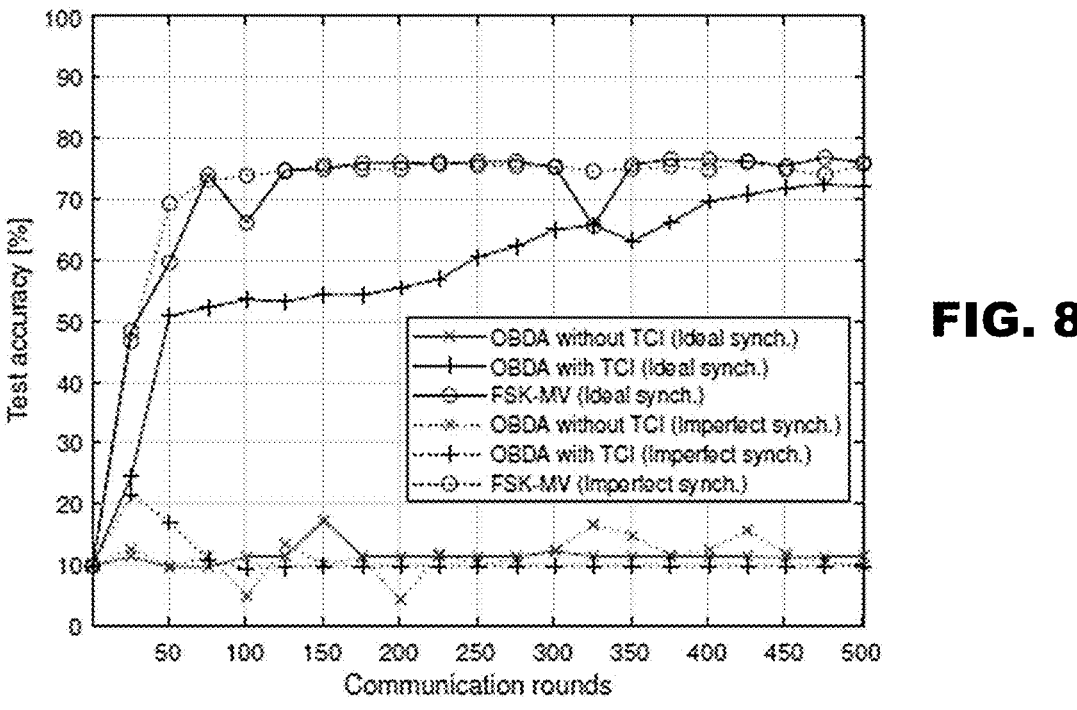
Figure 8D:
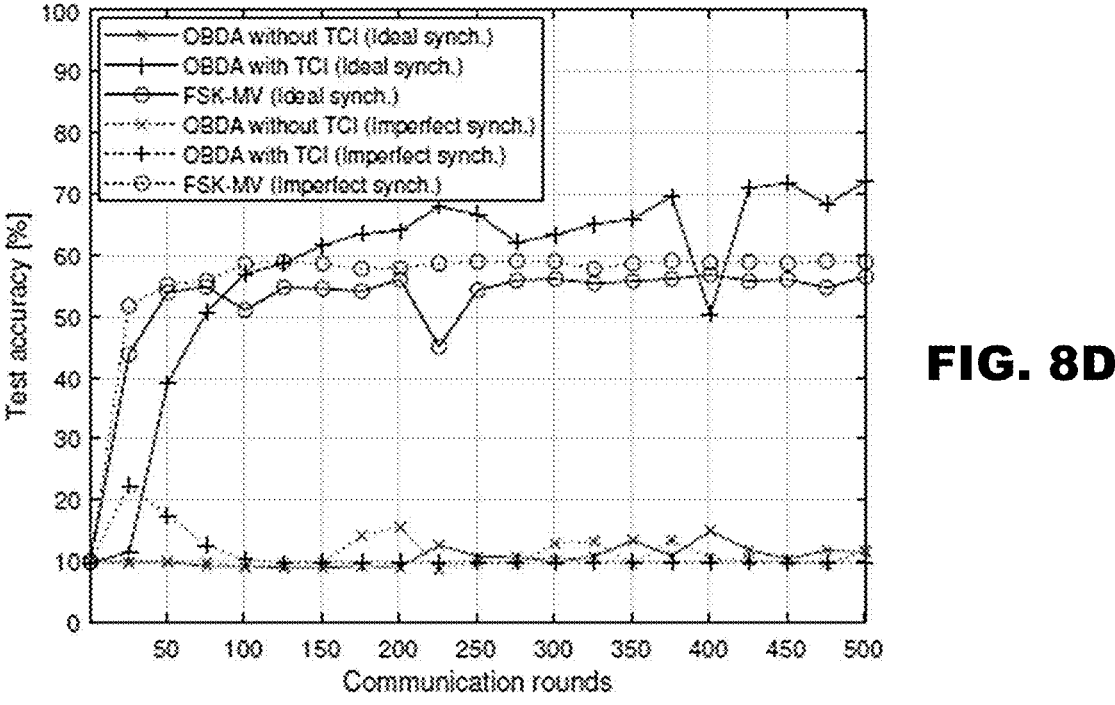
Figure 9A:
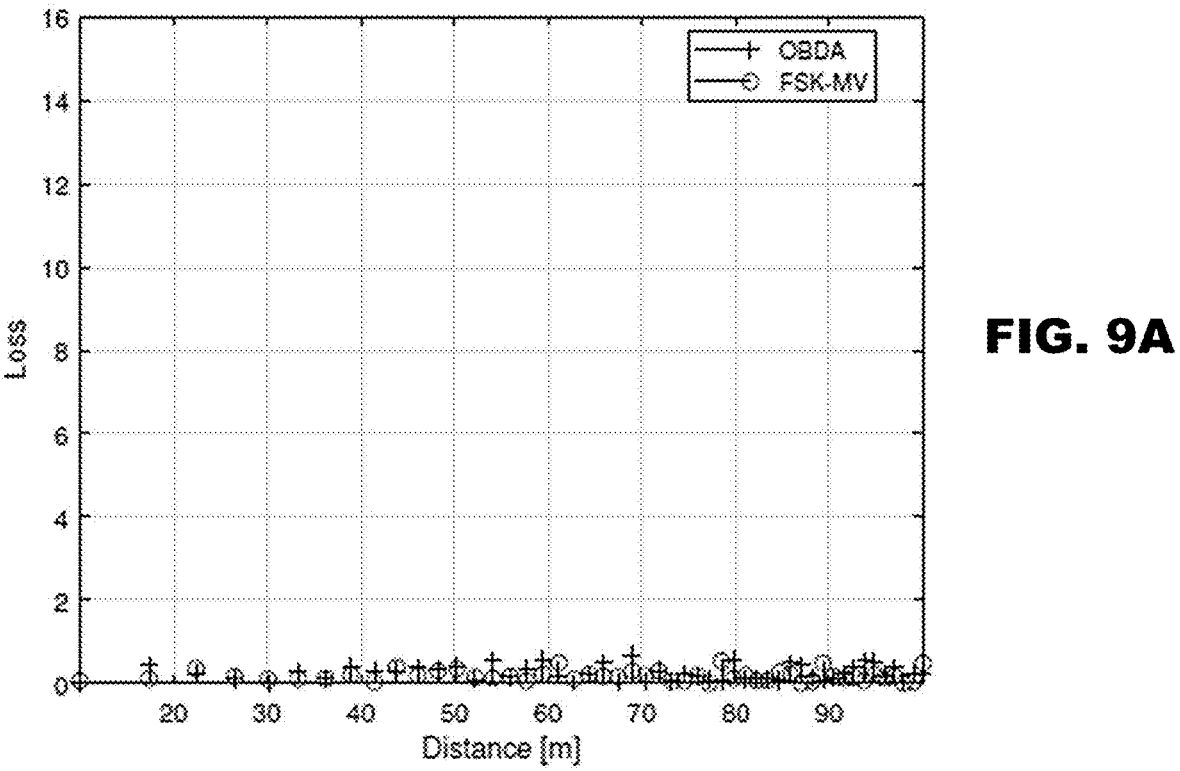
FIGS. 9A-9D, for the same configurations as FIGS. 8A-8D, respectively, illustrate the local loss values at the EDs as function of link distance after N=500 communication rounds.
Figure 9B:
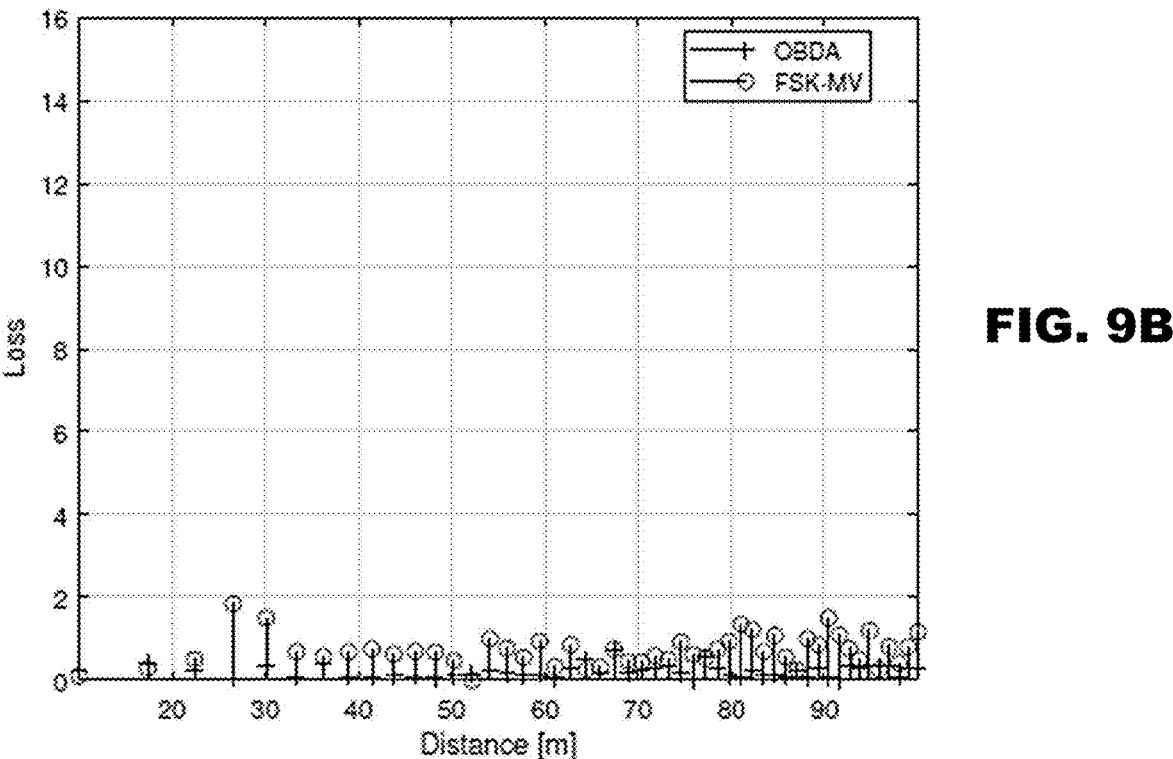
Figure 9C:
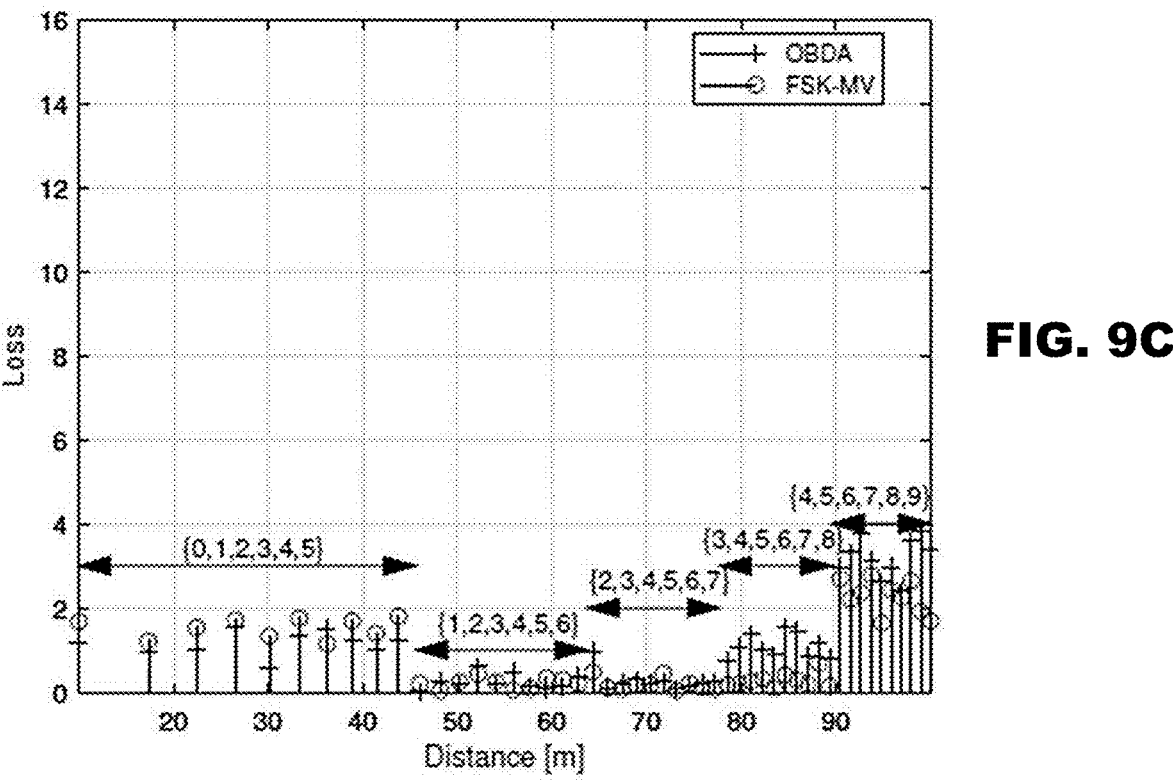
Figure 9D:
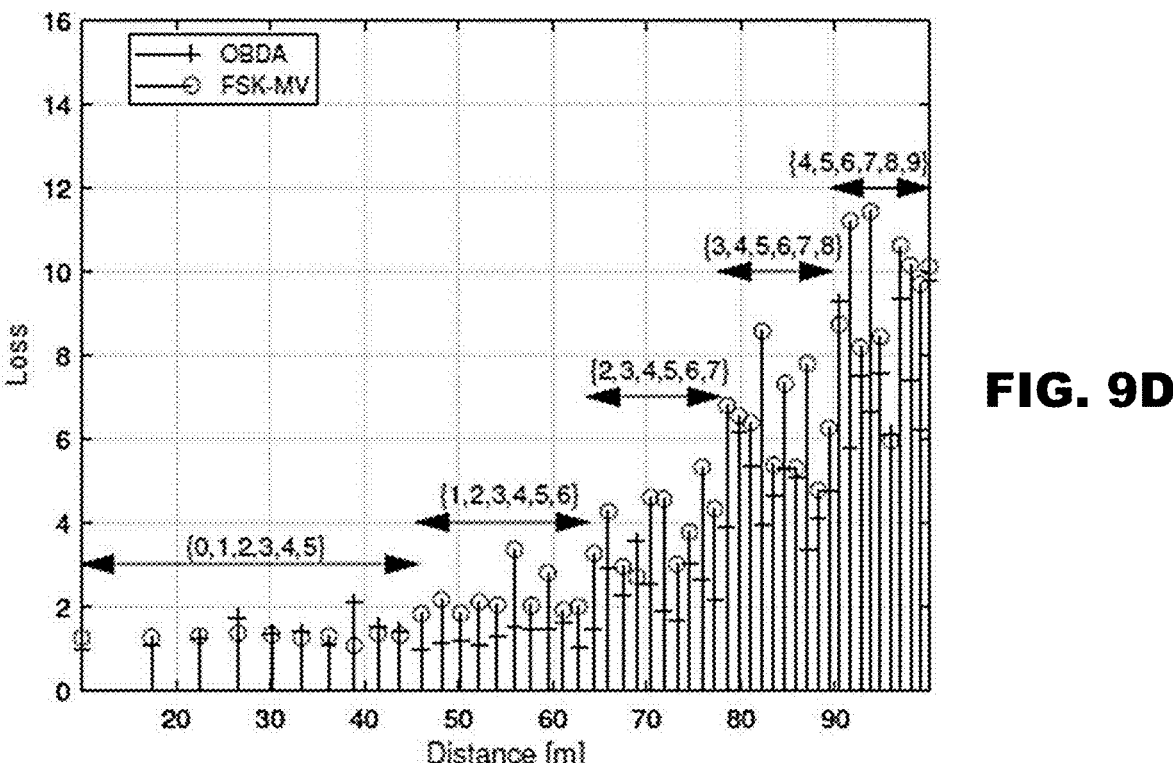

In FIGS. 8A-8D, we provide the test accuracy results for IID/non-IID data in the cell by taking time-synchronization errors and imperfect power control. In particular, FIG. 8A illustrates IID data, ideal power control ($\alpha_{eff}$=0), FIG. 8B illustrates (b) IID data, imperfect power control ($\alpha_{eff}$=2), FIG. 8C illustrates non-IID data, ideal power control ($\alpha_{eff}$=0), and FIG. 8D illustrates non-IID data, imperfect power control ($\alpha_{eff}$=2). For the same configurations, we provide the local loss values at the EDs as function of link distance in FIGS. 9A-9D after N=500 communication rounds. In particular, FIGS. 9A-9D illustrate local loss versus link distance. For non-IID data, the data samples are function of the locations of EDs. Since the received signal power of the cell-edge EDs are dominated by the nearby EDs, only data samples at the nearby ED are learned. For this analysis, an ideal time synchronization is assumed in order to provide the results for OBDA. The available labels are indicated as { . . . }. In particular, FIG. 9A illustrates IID data, ideal power control ($\alpha_{eff}$=0), FIG. 9B illustrates (b) IID data, imperfect power control ($\alpha_{eff}$=2), FIG. 9C illustrates non-IID data, ideal power control ($\alpha_{eff}$=0), and FIG. 9D illustrates non-IID data, imperfect power control ($\alpha_{eff}$=2).

In FIG. 8A-8B, we consider the IID data in the cell. We evaluate the scenarios with the non-IID data in FIG. 8C-8D. For FIG. 8A, the power alignment at the ES is assumed to be perfect (i.e., $\alpha_{eff}$=0). The results in this figure indicate that OBDA works well when the time synchronization is ideal, and the CSI is available at the EDs. However, OBDA without TCI or its utilization under imperfect time synchronization cause drastic reductions in the performance. On the other hand, the FSK-MV is robust against the time-synchronization errors and result a high-test accuracy without using CSI at the EDs as it is based on non-coherent detection and dedicates two orthogonal resources to indicate the sign of the gradient. In FIG. 8B-8D, we observe the same trends for OBDA and FSK-MV. However, the maximum test accuracy is highly affected by the data distribution and the power control. In FIG. 8B, the power alignment at the ES is not ideal (i.e., $\alpha_{eff}$=2).

Figure 10:
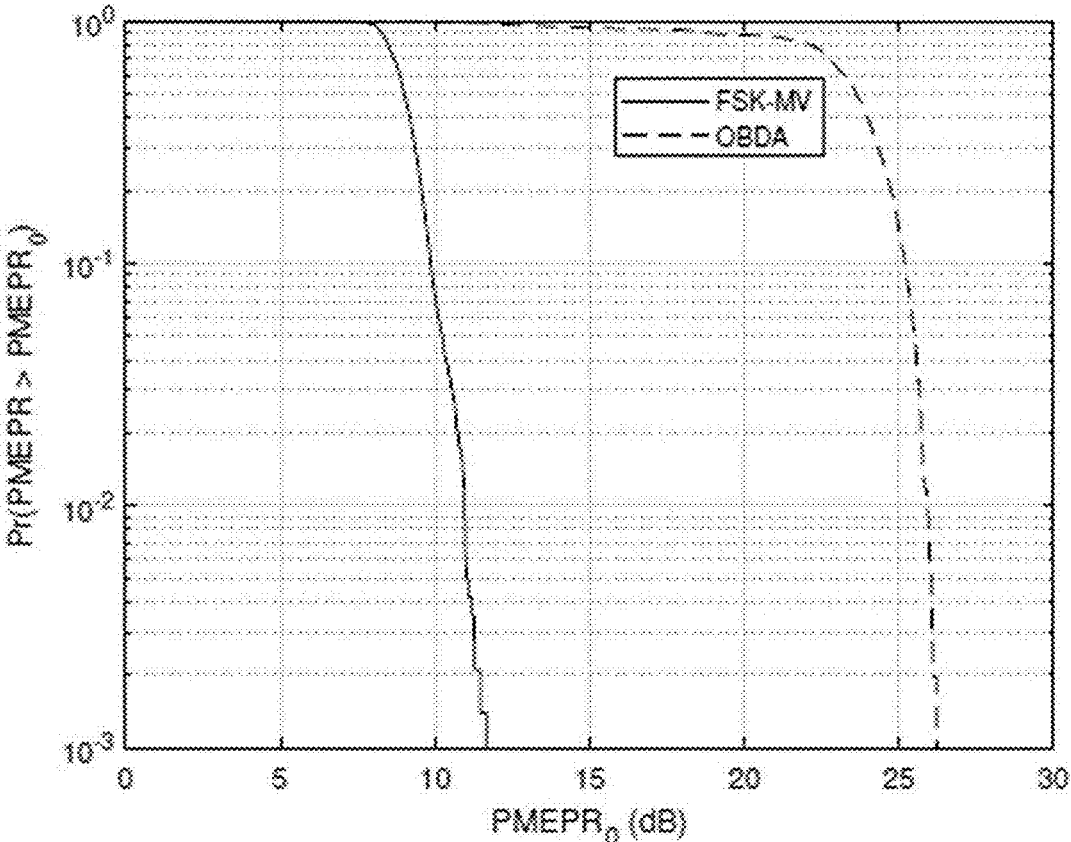
FIG. 10 graphically compares the PMEPR distributions for OBDA and FSK-MV.

Although the test accuracy with OBDA with TCI (with ideal synchronization) or FSK-MV (with/without ideal synchronization) reaches to 95%, FIG. 9B indicates the local losses increase at the EDs as compared to the ones in FIG. 9A. In this scenario, the distributed learning exploits the IID-data in the cell, which also benefits to the cell-edge EDs that have the similar data distributions to the ones at the nearby EDs. In FIG. 8C, we see the impact of the non-IID data on the test accuracy. Although the power alignment is ideal in this case, the maximum test accuracy reduces to 75% from 95%. We observe more degradation in accuracy in FIG. 8D, where the power control is not ideal. In FIG. 9C-9D, we can identify the digits that are not learned well. In the case of ideal power control, based on FIG. 9D, we observe that the digit 0 and the digit 9 are not learned well since these digits are available in a smaller number of EDs as compared to other digits. Hence, the MV is highly biased. A similar issue arises when the power control is not perfect. As shown in FIG. 9D, the local loss function tends to increase with the distance, i.e., the cell-edge EDs data are not learned. As the cell-edge EDs signal powers received are weak as compared the ones for the nearby EDs, the MV is again biased toward the nearby EDs local data. Therefore, the digits available at the cell-edge EDs, e.g., digits 6, 7, 8, and 9, are not learned well. Both issues in the case of non-IID data indicate that an adaptive learning strategy that takes the bias in the MV into account (e.g., through an adaptive ED selection or a power control based on the label distribution) is needed for achieving a higher test accuracy. Finally, we compare the PMEPR distributions in FIG. 10 for OBDA and FSK-MV. Since the proposed scheme introduces randomness in the frequency domain with the randomization symbols, it exhibits a similar behavior to a typical OFDM transmission in terms of PMEPR. On the other hand, the OBDA can cause substantially high PMEPR for OFDM as the signs of the gradients can be highly correlated.

Concluding Remarks

In this study, we propose an effective AirComp scheme for FEEL. The proposed scheme relies on the distributed learning by the MV with the signSGD in fading channel. As compared to the state-of-the-art solutions on AirComp, it uses different subcarriers and/or OFDM symbols to indicate the sign of the local stochastic gradients. Thus, it allows the receiver at the ES to detect the MV with a non-coherent detector and eliminates the need for CSI at the EDs by exploiting the non-coherent energy accumulation on the subcarriers. We also prove the convergence of the distributed learning by taking path loss, power control, and cell size into account. Through simulations, we demonstrate that the proposed method can provide a high-test accuracy in fading channel even when the power control and the time synchronization are imperfect while resulting in an acceptable PMEPR distribution at the expense of a larger number of time and frequency resources. We also provide insights into the scenarios where local data distribution depends on the locations of the EDs and demonstrate the impact of non-IID data on the distributed learning when the power control is not ideal. Our results indicate that adaptive learning methods that consider the bias in the MV due to the non-IID data and/or imperfect power control are required for achieving a higher test accuracy.

APPENDIX PROOF OF THEOREM 1

Proof: The proof of Theorem 1 relies on a well-known strategy of relating the norm of the gradient of the loss function F(w) to the expected improvement made in a single step as described in [11]. Let $g^{(n)}$ be the gradient of $F(w^{(n)})$ (i.e., the true gradient). By using Assumption 2 and using (13), we can state that $$F\left(w^{(n+1)}\right) - F\left(w^{(n)}\right) \le -\eta g^{(n)T} v^{(n)} + \frac{\eta^2}{2}\|L\|_1 =$$

$$-\eta\left\|g^{(n)}\right\|_1 + \frac{\eta^2}{2}\|L\|_1 + 2\eta\sum_{i=1}^{q} \left|g_i^{(n)}\right| \Pi\left[\text{sign}(\Delta_i^{(n)}) \ne \text{sign}(g_i^{(n)})\right].$$

Therefore, $$\mathbb{E}\left[F\left(w^{(n+1)}\right) - F\left(w^{(n)}\right) \mid w^{(n)}\right] \le -\eta\left\|g^{(n)}\right\|_1 + \frac{\eta^2}{2}\|L\|_1 +$$

$$2\eta\sum_{i=1}^{q}\left|g_i^{(n)}\right| \underbrace{\mathbb{P}\left[\text{sign}(\Delta_i^{(n)}) \ne \text{sign}(g_i^{(n)})\right]}_{\triangleq P_i^{err}}.$$

Stochasticity–induced error

The main challenge is to obtain an upper bound on the stochasticity-induced error. To address this, assume that $\text{sign}(g_i^{(n)})$=1. Let Z be a random variable for counting the number of EDs with the correct decision, i.e., $\text{sign}(g_i^{(n)})$=1.

The random variable Z can then be model as the sum of K independent Bernoulli trials, i.e., a binomial variable with the success and failure probabilities given by $$P_i \triangleq \mathbb{P}_{[\text{sign}(\tilde{g}_{k,i}^{(n)})=\text{sign}(g_i^{(n)})]}$$

$$q_i \triangleq \mathbb{P}_{[\text{sign}(\tilde{g}_{k,i}^{(n)})\neq\text{sign}(g_i^{(n)})]}$$

respectively, for all k. This implies that $$P_i^{err} = \sum_{K_i^+=0}^{K} \mathbb{P}\left[\text{sign}(\Delta_i^{(n)}) \neq 1 | Z = K_i^+\right] \mathbb{P}[Z = K_i^+]$$

where $\mathbb{P}[Z = K_i^+] = \binom{K}{K_i^+} P_i^{K_i^+} q_i^{K-K_i^+}$.

To calculate $\mathbb{P}$ $[\text{sign}(\Delta_i^{(n)})\neq1|Z=K_i^+]$, we use the distribution of $\Delta_i^{(n)}$, which can be obtained by using the properties of exponential random variables as $$f(\Delta_i^{(n)}) = \begin{cases} \dfrac{e^{-\frac{\Delta_i^{(n)}}{\mu_i^-}}}{\mu_i^+ + \mu_i^-}, \Delta_i^{(n)} \leq 0 \\ \dfrac{e^{-\frac{\Delta_i^{(n)}}{\mu_i^+}}}{\mu_i^+ + \mu_i^-}, \Delta_i^{(n)} > 0 \end{cases} \quad (23)$$

Thus, by integrating (23) with respect to $\Delta_i^{(n)}$, $$\mathbb{P}\left[\text{sign}(\Delta_i^{(n)}) \neq 1 | Z = K_i^+\right] = \frac{\mu_i^-}{\mu_i^+ + \mu_i^-} = \frac{(K - K_i^+) + 1/\xi}{K + 2/\xi} \quad (24)$$

Hence, by using (24) and the properties of binomial coefficients $$P_i^{err} = \sum_{K_i^+=0}^{K} \frac{(K - K_i^+) + 1/\xi}{1 + 2/\xi} \binom{K}{K_i^+} P_i^{K_i^+} q_i^{K-K_i^+} = \frac{\frac{1}{\xi K}}{1 + \frac{2}{K\xi}} + \frac{q_i}{1 + \frac{2}{K\xi}} \quad (25)$$

Under Assumption 2 and Assumption 3, by using the derivations in [11], it can be shown that $$q_i \leq \frac{\sqrt{2}\,\sigma_i}{3|g_i^{(n)}|\sqrt{n_b}}.$$

Hence, an upper bound on the stochasticity-induced error can be obtained as $$\sum_{i=1}^{q} |g_i^{(n)}| P_i^{err} \leq \frac{\frac{1}{\xi K}}{1 + \frac{2}{K\xi}} \|g^{(n)}\|_1 + \frac{1}{\sqrt{n_b}} \frac{\sqrt{2}/3}{1 + \frac{2}{K\xi}} \|\sigma\|_1$$

Based on Assumption 1, $$F(w^{(0)}) - F^* \geq F(w^{(0)}) - \mathbb{E}\left[F(w^{(N)})\right] = \mathbb{E}\left[\sum_{n=0}^{N-1} F(w^{(n)}) - F(w^{(n+1)})\right] \geq \quad (26)$$

-continued $$\mathbb{E}\left[\sum_{n=0}^{N-1} \frac{\eta}{1 + \frac{2}{K\xi}} \|g^{(n)}\|_1 - \frac{\eta^2}{2}\|L\|_1 - \frac{\eta}{\sqrt{n_b}} \frac{2\sqrt{2}/3}{1 + \frac{2}{K\xi}}\right]$$

By rearranging the terms in (26) and using the expressions for $n_b$ and $\eta$, (22) is reached.

While certain embodiments of the disclosed subject matter have been described using specific terms, such description is for illustrative purposes only, and it is to be understood that changes and variations may be made without departing from the spirit or scope of the subject matter. The patentable scope of the presently disclosed subject matter is defined by the claims, and may include other examples that occur to those skilled in the art. Such other examples are intended to be within the scope of the claims if they include structural and/or step elements that do not differ from the literal language of the claims, or if they include equivalent structural and/or elements or steps with insubstantial differences from the literal language of the claims.

REFERENCES

[1] T. Gafni, N. Shlezinger, K. Cohen, Y. C. Eldar, and H. V. Poor, "Federated learning: A signal processing perspective," 2021. [Online]. Available: arXiv:2103.17150

[2] M. Chen, D. Gündüz, K. Huang, W. Saad, M. Bennis, A. V. Feljan, and H. V. Poor, "Distributed learning in wireless networks: Recent progress and future challenges," 2021. [Online]. Available: arXiv:2104.02151

[3] M. Goldenbaum, H. Boche, and S. Sta'nczak, "Harnessing interference for analog function computation in wireless sensor networks," *IEEE Trans. Signal Process.*, vol. 61, no. 20, pp. 4893-4906, October 2013.

[4] W. Liu, X. Zang, Y. Li, and B. Vucetic, "Over-the-air computation systems: Optimization, analysis and scaling laws," *IEEE Trans. Wireless Commun.*, vol. 19, no. 8, pp. 5488-5502, August 2020.

[5] B. Nazer and M. Gastpar, "Computation over multiple-access channels," *IEEE Trans. Inf. Theory*, vol. 53, no. 10, pp. 3498-3516, October 2007.

[6] G. Zhu, Y. Wang, and K. Huang, "Broadband analog aggregation for low-latency federated edge learning," *IEEE Trans. Wireless Commun.*, vol. 19, no. 1, pp. 491-506, January 2020.

[7] G. Zhu, Y. Du, D. Gündüz, and K. Huang, "One-bit over-the-air aggregation for communication-efficient federated edge learning: Design and convergence analysis," *IEEE Trans. Wireless Commun.*, vol. 20, no. 3, pp. 2120-2135, November 2021.

[8] J. Bernstein, Y.-X. Wang, K. Azizzadenesheli, and A. Anandkumar, "signSGD: Compressed optimisation for non-convex problems," in Proc. in International Conference on Machine Learning, vol. 80. *Proceedings of Machine Learning Research*, 10-15 Jul. 2018, pp. 560-569.

[9] T. Sery, N. Shlezinger, K. Cohen, and Y. C. Eldar, "Over-the-air federated learning from heterogeneous data," 2020. [Online]. Available: arXiv:2009.12787

[10] M. M. Amiri and D. Gündüz, "Federated learning over wireless fading channels," *IEEE Trans. Wireless Commun.*, vol. 19, no. 5, pp. 3546-3557, February 2020.

[11] K. Yang, T. Jiang, Y. Shi, and Z. Ding, "Federated learning via over the air computation," *IEEE Trans. Wireless Commun.*, vol. 19, no. 3, pp. 2022-2035, 2020.

[12] M. M. Amiria, T. M. Duman, D. Gündüz, S. R. Kulkarni, and H. Vincent Poor, "Collaborative machine learning at the wireless edge with blind transmitters," *IEEE Trans. Wireless Commun.*, pp. 1-1, March 2021.

[13] Y. A. Jawhar, L. Audah, M. A. Taher, K. N. Ramli, N. S. M. Shah, M. Musa, and M. S. Ahmed, "A review of partial transmit sequence for PAPR reduction in the OFDM systems," *IEEE Access*, vol. 7, pp. 18021-18041, 2019.

[14] T. Zeng, O. Semiari, M. Mozaffari, M. Chen, W. Saad, and M. Bennis, "Federated learning in the sky: Joint power allocation and scheduling with UAV swarms," in Proc. *IEEE International Conference on Communications* (ICC), 2020, pp. 1-6.

[001] T. Gafni, N. Shlezinger, K. Cohen, Y. C. Eldar, and H. V. Poor, "Federated learning: A signal processing perspective," 2021. [Online]. Available: arXiv:2103.17150

[002] M. Chen, D. Gündüz, K. Huang, W. Saad, M. Bennis, A. V. Feljan, and H. Vincent Poor, "Distributed learning in wireless networks: Recent progress and future challenges," IEEE J. Sel. Areas Commun., pp. 1-26, 2021.

[003] H. Hellstrom, J. M. B. da Silva Jr, V. Fodor, and C. Fischione, "Wireless for machine learning," 2020.

[004] M. Goldenbaum, H. Boche, and S. Stan'czak, "Harnessing interference for analog function computation in wireless sensor networks," IEEE Trans. Signal Process., vol. 61, no. 20, pp. 4893-4906, October 2013.

[005] W. Liu, X. Zang, Y. Li, and B. Vucetic, "Over-the-air computation systems: Optimization, analysis and scaling laws," IEEE Trans. Wireless Commun., vol. 19, no. 8, pp. 5488-5502, August 2020.

[006] B. Nazer and M. Gastpar, "Computation over multiple-access channels," IEEE Trans. Inf. Theory, vol. 53, no. 10, pp. 3498-3516, October 2007.

[007] G. Zhu, Y. Wang, and K. Huang, "Broadband analog aggregation for low-latency federated edge learning," IEEE Trans. Wireless Commun., vol. 19, no. 1, pp. 491-506, January 2020.

[008] T. Sery, N. Shlezinger, K. Cohen, and Y. C. Eldar, "Over-the-air federated learning from heterogeneous data," 2020. [Online]. Available: arXiv:2009.12787

[009] M. M. Amiri and D. Gündüz, "Federated learning over wireless fading channels," IEEE Trans. Wireless Commun., vol. 19, no. 5, pp. 3546-3557, February 2020.

[010] G. Zhu, Y. Du, D. Gündüz, and K. Huang, "One-bit over-the-air aggregation for communication-efficient federated edge learning: Design and convergence analysis," IEEE Trans. Wireless Commun., vol. 20, no. 3, pp. 2120-2135, November 2021.

[011] J. Bernstein, Y.-X. Wang, K. Azizzadenesheli, and A. Anandkumar, "signSGD: Compressed optimisation for non-convex problems," in Proc. in International Conference on Machine Learning, vol. 80. Proceedings of Machine Learning Research, 10-15 Jul. 2018, pp. 560-569.

[012] K. Yang, T. Jiang, Y. Shi, and Z. Ding, "Federated learning via over-the-air computation," IEEE Trans. Wireless Commun., vol. 19, no. 3, pp. 2022-2035, 2020.

[013] M. M. Amiria, T. M. Duman, D. Gündüz, S. R. Kulkarni, and H. Vin-cent Poor, "Collaborative machine learning at the wireless edge with blind transmitters," IEEE Trans. Wireless Commun., pp. 1-1, March 2021.

[014] E. Dahlman, S. Parkvall, and J. Skold, 5G NR: The Next Generation Wireless Access Technology, 1st ed. USA: Academic Press, Inc., 2018.

[015] A. Sahin, B. Everette, and S. Hoque, "Over-the-air computation with DFT-spread OFDM for federated edge learning," in Proc. IEEE Wireless Communications and Networking Conference (WCNC) (submitted), April 2022, pp. 1-6.

[016] T. Zeng, O. Semiari, M. Mozaffari, M. Chen, W. Saad, and M. Bennis, "Federated learning in the sky: Joint power allocation and scheduling with UAV swarms," in Proc. IEEE International Conference on Communications (ICC), 2020, pp. 1-6.

[017] Y. A. Jawhar, L. Audah, M. A. Taher, K. N. Ramli, N. S. M. Shah, M. Musa, and M. S. Ahmed, "A review of partial transmit sequence for PAPR reduction in the OFDM systems," IEEE Access, vol. 7, pp. 18 021-18 041, 2019.

What is claimed is:

1. An over-the-air computation (AirComp) methodology for improving the communication efficiency and robustness of federated edge learning (FEEL) in a wireless multiple access channel with fast-fading channels, without requiring channel state information (CSI) at a plurality of edge devices (EDs) or at an edge server(ES) for broadband aggregation, comprising:

a distributed machine-learning model comprising a convolutional neural network (CNN) for handwritten-digit recognition to be trained with update vectors received at an edge server(ES) as transmitted from a plurality of edge devices (EDs);

one or more processors; and one or more non-transitory computer-readable media that store instructions that, when executed by the one or more processors, cause the one or more processors to perform operations, the operations comprising:

transmitting local update vectors, representing one-bit quantized signs of local stochastic gradients, as weighted votes from each respective of the plurality of EDs by activating one of two selected multiple orthogonal subcarriers grouped based on the sign of the elements of the update vector from each respective of the plurality of edge devices (EDs) via a wireless multiple access channel, wherein the transmission utilizes randomization symbols on the active subcarriers to reduce Peak-to-Mean Envelope Power Ratio (PMEPR), receiving superposed local updates at the ES, determining the majority vote (MV) for each element of the update vector at the ES with a non-coherent energy detector operating over the selected multiple orthogonal subcarriers, wherein the non-coherent detection is enabled by the separation of votes onto orthogonal resources to eliminate the need for truncated channel inversion (TCI) at the EDs and to provide robustness against time-synchronization errors, and inputting the MVs into the machine-learning model to be updated, wherein the votes comprise orthogonal frequency division multiplexing (OFDM) symbols over multiple OFDM subcarriers, and determining operations use one-bit broadband digital aggregation (OBDA) and frequency-shift keying (FSK)-based methodology.

2. The over-the-air computation (AirComp) methodology according to claim 1, further comprising operations wherein the transmission utilizes randomization symbols on active subcarriers to reduce peak-to-mean envelope power ratio (PMEPR) below that of one-bit broadband digital aggregation with Quadrature Amplitude Modulation (OBDA-QAM).

3. The over-the-air computation (AirComp) methodology according to claim 1, wherein the machine learning model comprises artificial intelligence technology over wireless or sensor networks, 5G or higher, 6G wireless standardization, or IEEE 802.11 Wi-Fi.

4. The over-the-air computation (AirComp) methodology according to claim 1, wherein the transmitting local updates operation includes use of gradient averaging.

5. The over-the-air computation (AirComp) methodology according to claim 4, wherein a local gradient estimate $g_k^{(n)}$ for the kth ED at the nth communication round between at least one ED and the ES comprises:

$$g_k^{(n)} = \nabla F_k\left(w^{(n)}\right) = \frac{1}{D} \sum_{\forall \ell \in D_k} \nabla f\left(w^{(n)}, X_\ell, y_\ell\right)$$

where $\nabla$ represents the gradient operator, and where f (w, $X_\ell$, $y_\ell$) is the sample loss function that measures the labelling error for ($X_\ell$, $y_\ell$) for the training parameters w.

6. The over-the-air computation (AirComp) methodology according to claim 5, further comprising global gradient operations that the ES determines and distributes a global gradient estimate to the EDs and the current machine-learning model is updated based on a common update rule, and the global gradient operations are repeated consecutively until a predetermined convergence criterion is achieved.

7. The over-the-air computation (AirComp) methodology according to claim 1, wherein the transmitting local updates operation includes use of signs of local gradients by the respective EDs with using a general weight function to increase the probability of the detecting the correct MV.

8. The over-the-air computation (AirComp) methodology according to claim 1, further comprising operations, after a signal passes from each ED through their own multipath channels, the ES observes the superposed symbols on the same subcarrier indices.

9. The over-the-air computation (AirComp) methodology according to claim 8, further comprising detector operations at the ES that the detector compares the energies on two adjacent subcarriers to determine the gradient vector.

10. The over-the-air computation (AirComp) methodology according to claim 1, wherein the machine-learning model comprises a convolution neural network with multiple convolutional layers, with each convolutional layer followed by a batch normalization layer and rectified-linear unit (ReLU) activation.

11. The over-the-air computation (AirComp) methodology according to claim 10, wherein each of the multiple convolutional layers has a plurality of filters, and a fully connected layer with plural units and a softmax layer are used after one of the ReLU.

12. An over-the-air computation (AirComp) system for improving the communication efficiency and robustness of federated edge learning (FEEL) in a wireless multiple access channel with fast-fading channels, without requiring channel state information (CSI) at a plurality of edge devices (EDs) or at an edge server(ES) for broadband aggregation, comprising:

a distributed machine-learning model comprising a convolutional neural network (CNN) for handwritten-digit recognition training to process data comprising update vectors received at an edge server(ES) as transmitted from a plurality of edge devices (EDs);

one or more processors; and one or more non-transitory computer-readable media that store instructions that, when executed by the one or more processors, cause the one or more processors to perform operations, the operations comprising:

transmitting local update vectors, representing one-bit quantized signs of local stochastic gradients, as weighted votes from each respective of the plurality of EDs by activating one of two selected multiple orthogonal subcarriers grouped based on the sign of the elements of the update vector from each respective of the plurality of edge devices (EDs) via a wireless multiple access channel, wherein the transmission utilizes randomization symbols on the active subcarriers to reduce Peak-to-Mean Envelope Power Ratio (PMEPR), receiving the superposed local updates at the ES, determining the majority vote (MV) for each element of the update vector at the ES with a non-coherent energy detector operating over the selected multiple orthogonal subcarriers, wherein the non-coherent detection is enabled by the separation of votes onto orthogonal resources to eliminate the need for truncated channel inversion (TCI) at the EDs and to provide robustness against time-synchronization errors, and inputting the obtained data into the machine-learning model as training data or data to process, wherein the votes comprise orthogonal frequency division multiplexing (OFDM) symbols over multiple OFDM subcarriers, and determining operations use one-bit broadband digital aggregation (OBDA) and frequency-shift keying (FSK)-based methodology.

13. The over-the-air computation (AirComp) system according to claim 12, further comprising global gradient operations comprising that the ES determines and distributes a global gradient estimate to the EDs and the current machine-learning model is updated based on a common update rule, and the global gradient operations are repeated consecutively until a predetermined convergence criterion is achieved.

14. The over-the-air computation (AirComp) system according to claim 12, wherein the CNN model comprises a convolution neural network with multiple convolutional layers, with each convolutional layer followed by a batch normalization layer and rectified-linear unit (ReLU) activation.

* * * * *